(12) United States Patent
Puffer et al.

(10) Patent No.: US 11,536,424 B2
(45) Date of Patent: Dec. 27, 2022

(54) VENTILATION FAN SYSTEM WITH ADVANCED CHROMATHERAPY CONTROLS

(71) Applicant: Broan-NuTone LLC, Hartford, WI (US)

(72) Inventors: Benjamin Puffer, Hartford, WI (US); Bernard Krauska, Hartford, WI (US); Colin Norton, Hartford, WI (US); Jason Asmus, Hartford, WI (US); Julie Stange, Hartford, WI (US); Lauren Weigel, Hartford, WI (US)

(73) Assignee: Broan-NuTone LLC, Hartford, WI (US)

( * ) Notice: Subject to any disclaimer, the term of this patent is extended or adjusted under 35 U.S.C. 154(b) by 0 days.

(21) Appl. No.: 17/584,575

(22) Filed: Jan. 26, 2022

(65) Prior Publication Data

US 2022/0154897 A1  May 19, 2022

Related U.S. Application Data

(60) Continuation of application No. 17/148,774, filed on Jan. 14, 2021, now Pat. No. 11,262,035, which is a
(Continued)

(51) Int. Cl.
*F21S 8/04* (2006.01)
*F21S 8/02* (2006.01)
(Continued)

(52) U.S. Cl.
CPC . *F21S 8/04* (2013.01); *F21S 8/02* (2013.01); *F21S 9/03* (2013.01); *F21V 23/0442* (2013.01);
(Continued)

(58) Field of Classification Search
CPC ........ F21S 8/04; F21S 8/02; F21S 9/03; F21S 8/026; F21V 23/0442; F21V 33/0088;
(Continued)

(56) References Cited

U.S. PATENT DOCUMENTS

2014/0063796 A1   3/2014  Zakula et al.
2014/0316584 A1  10/2014  Matsuoka et al.
(Continued)

OTHER PUBLICATIONS

International Search Report and Written Opinion issued in PCT/US2019/033558, dated Aug. 9, 2019 (14 pages).

*Primary Examiner* — Kevin Quarterman
(74) *Attorney, Agent, or Firm* — Barnes & Thornburg LLP

(57) ABSTRACT

According to an aspect of this disclosure, a ventilation and lighting system including a main housing having an inlet opening and a discharge opening, a blower and motor assembly disposed within a housing and operable to move air through the inlet and outlet, a grille configured to be located at the inlet opening, the grille having a cavity and a plate defining a plurality of apertures through which air may move, and one or more lighting elements arranged within the cavity and an optical component covering the cavity. The system is arranged such that light developed by the one or more lighting elements mixes within the cavity and transmits through the optical component covering the cavity, and the system further includes a controller that coordinates operation of the blower and motor assembly and the one or more lighting elements from a remote location.

20 Claims, 37 Drawing Sheets

Related U.S. Application Data division of application No. 16/419,968, filed on May 22, 2019, now Pat. No. 10,928,022.

(60) Provisional application No. 62/675,045, filed on May 22, 2018.

(51) Int. Cl.
| | |
|---|---|
| *F21S 9/03* | (2006.01) |
| *F21V 23/04* | (2006.01) |
| *F21V 33/00* | (2006.01) |
| *F24F 11/30* | (2018.01) |
| *F24F 13/078* | (2006.01) |
| *F24F 7/02* | (2006.01) |
| *F24F 120/10* | (2018.01) |
| *F21Y 113/20* | (2016.01) |
| *F24F 5/00* | (2006.01) |

(52) U.S. Cl.
CPC .......... *F21V 33/0088* (2013.01); *F24F 7/025* (2013.01); *F24F 11/30* (2018.01); *F24F 13/078* (2013.01); *F21Y 2113/20* (2016.08); *F24F 2005/0064* (2013.01); *F24F 2120/10* (2018.01)

(58) Field of Classification Search
CPC ..... F21V 23/0435; F24F 11/30; F24F 13/078; F24F 7/025; F24F 2120/10; F24F 2005/0064; F24F 11/58; F24F 2221/02; F21Y 2113/20; F21Y 2103/20; F21Y 2115/10; Y02B 10/10
See application file for complete search history.

(56) References Cited

U.S. PATENT DOCUMENTS

| | | |
|---|---|---|
| 2016/0069561 A1 | 3/2016 | Jonas et al. |
| 2016/0369809 A1 | 12/2016 | Richter |
| 2017/0122616 A1 | 5/2017 | Calabro |
| 2017/0359189 A1 | 12/2017 | Smith et al. |

VENTILATION FAN SYSTEM WITH ADVANCED CHROMATHERAPY CONTROLS

REFERENCE TO RELATED APPLICATIONS

The present application claims the benefit of U.S. utility patent application Ser. No. 17/148,774, filed Jan. 14, 2021, U.S. utility patent application Ser. No. 16/419,968, filed May 22, 2019 and U.S. provisional patent application No. 62/675,045, entitled "VENTILATION FAN SYSTEM WITH ADVANCED CHROMATHERAPY CONTROLS", filed May 22, 2018, the entire disclosure thereof being hereby incorporated by reference herein.

TECHNICAL FIELD

The present subject matter relates to a ventilation systems and, in particular, to a ventilation system having lighting elements, namely multi-colored lighting elements intended to provide chromatherapy benefits to people in the room or area in which the ventilation system is installed.

BACKGROUND

Often times, users, e.g., homeowners, decorators, designers, contractors, include both fans/ventilation systems and lighting elements in rooms. It may be desirable to combine fans/ventilation systems, such as bathroom fans, with lighting elements. Combination of these components may realize efficiencies, such as shared electrical connections and shared cut-outs into adjacent structure (e.g. a wall or a ceiling). Further, a grille covering a fan/ventilation system provides both aesthetic and functional value. Facilitating customization of grille sizes, shapes, colors, and other features of fan/ventilation systems may be desirable for users.

With widespread adoption of smartphones and mobile devices for implementation of smart home and internet of things (IoT) functionality, users are provided with more opportunities to connect to and control their environment. Remote operation of a ventilation and lighting system may also be desirable for users.

SUMMARY

According to an aspect of the disclosure, a ventilation fan system with a multi-colored lighting subsystem for chromatherapy is integrated therein. This combined ventilation and chromatherapy system includes one or more microprocessors and one or more user interfaces, such as a wall-mounted controller and/or a mobile application controller, to facilitate adjustment of lighting characteristics, such as color and intensity of light produced by the lighting system and output through the ventilation fan system. The combined ventilation and lighting system allows users to adjust both fan function and lighting settings, as well as service the controller, including accessing a control unit therein, without the need to interact with pre-existing household wiring. According to an aspect of the disclosure, ventilating fan systems may include one or more lighting elements incorporated therein as well as customizable shapes, sizes, patterns, and other exterior features. Customizable features of the ventilating fan systems may be manipulated such that the ventilating fan systems match and/or complement the environment wherein same are disposed.

Other aspects and advantages of the present disclosure will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, modules and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

Figure 1:
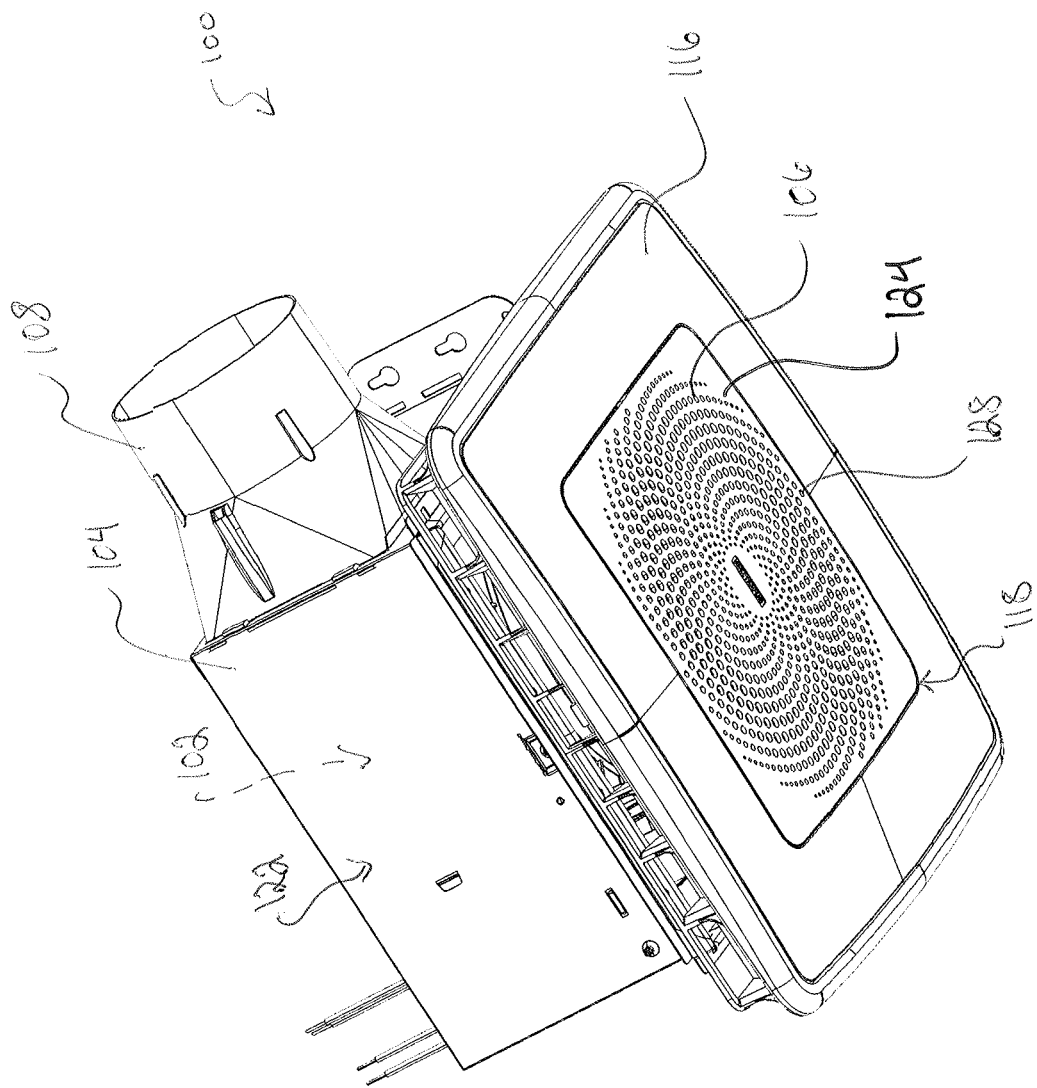
FIG. 1 is an isometric view from below of one embodiment of a ventilation and lighting system comprising a fan, a housing, a grille, and one or more lighting elements.
Figure 2:
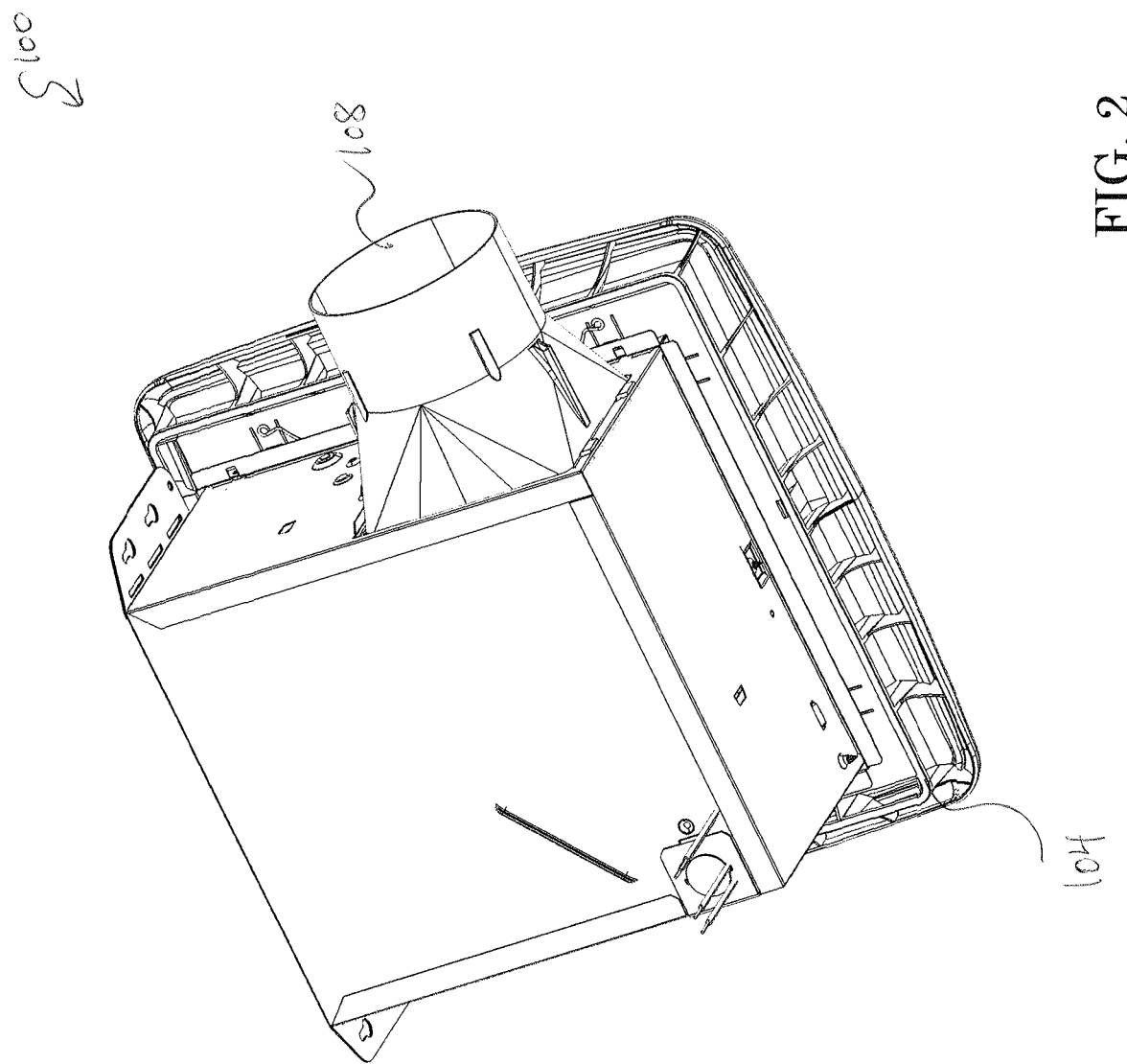
FIG. 2 is an isometric view from above of a rear side of the ventilation and lighting system of FIG. 1.
Figure 3:
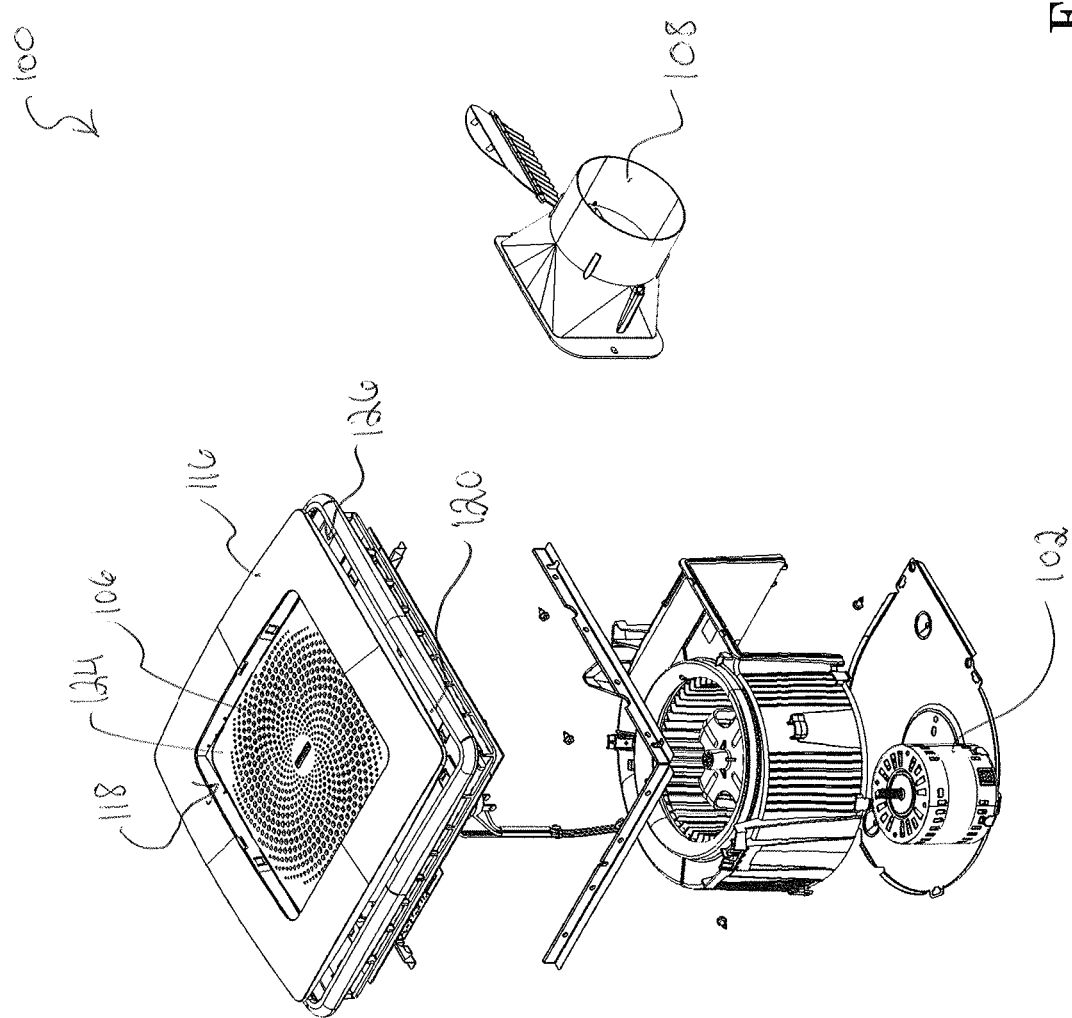
FIG. 3 is an exploded view of the ventilation and lighting system of FIG. 1.
Figure 4:
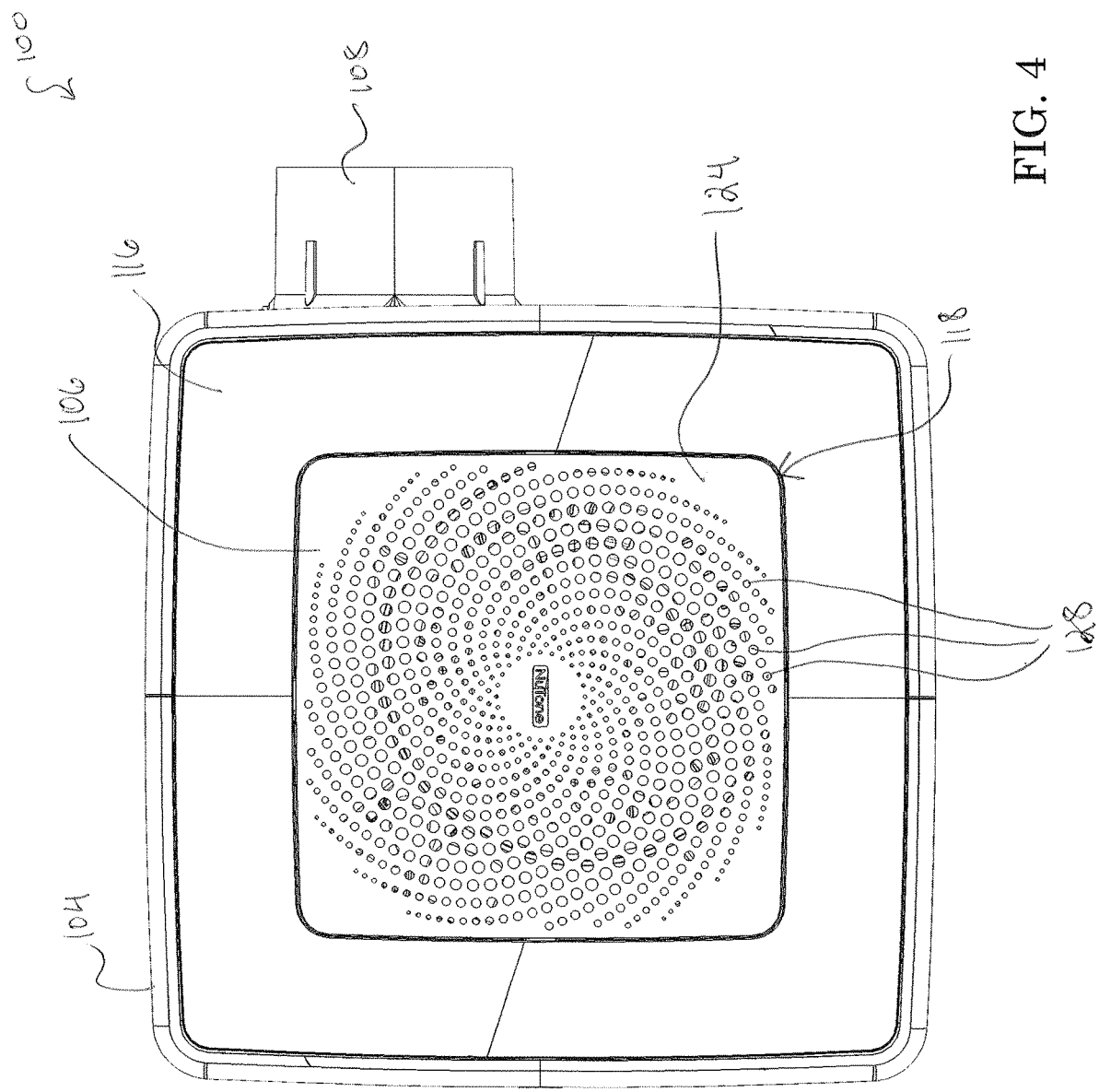
FIG. 4 is a plan view from below of the ventilation and lighting system of FIG. 1.
Figure 5:
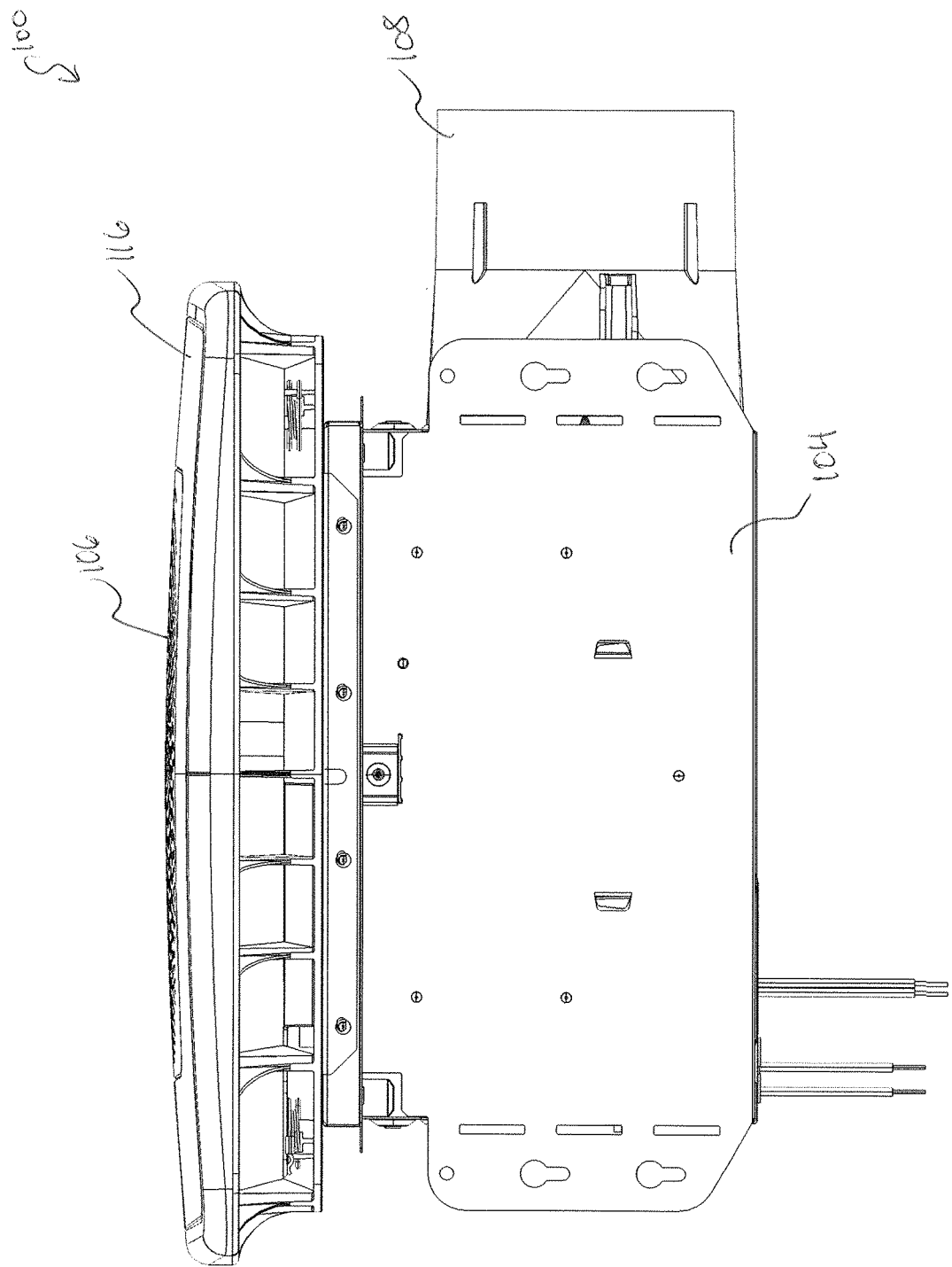
FIG. 5 is a side elevational view of the ventilation and lighting system of FIG. 1.
Figure 6:
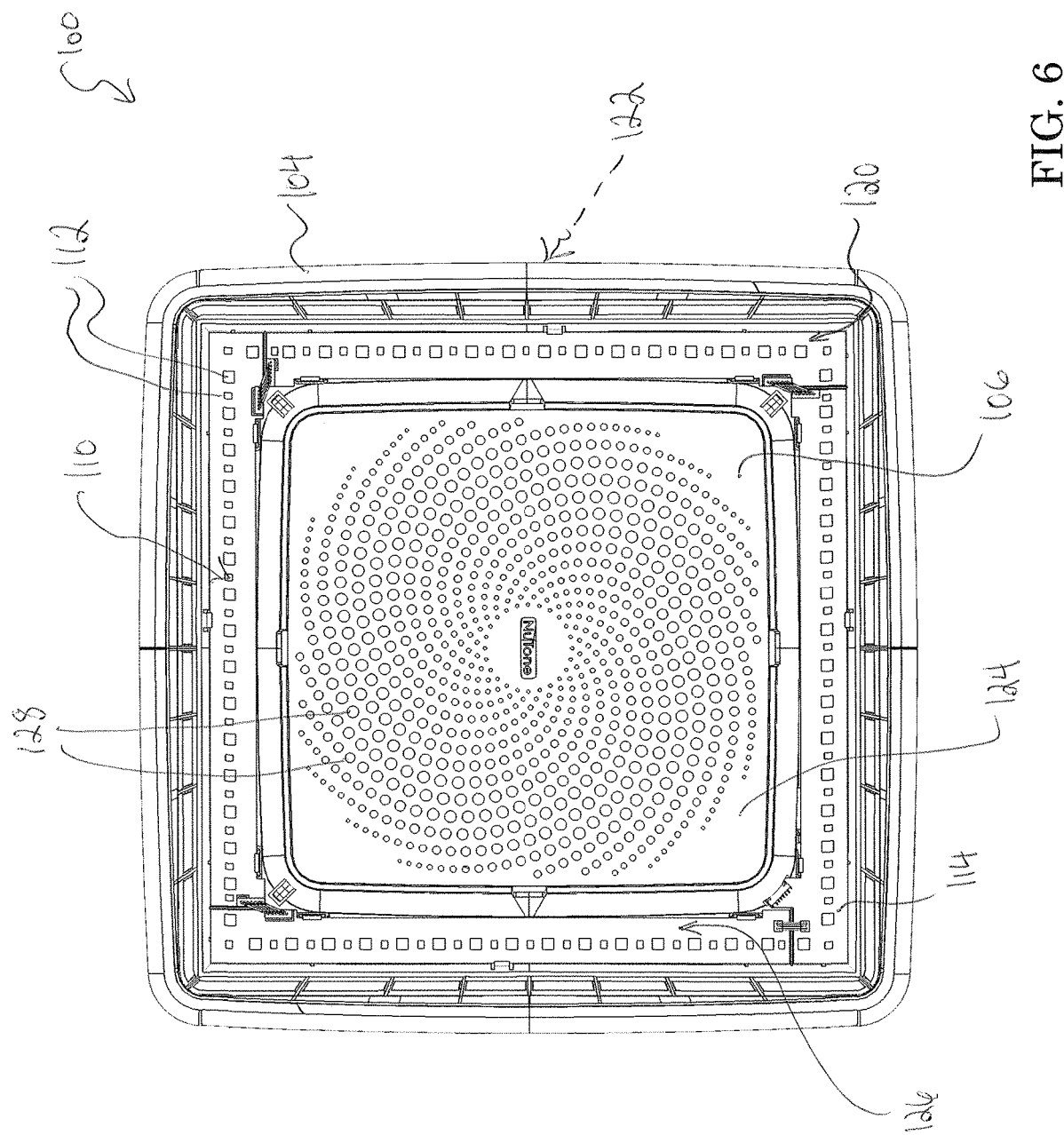
FIG. 6 is a plan view from below of the ventilation and lighting system of FIG. 1 with an opaque diffuser lens omitted such that the one or more lighting elements are visible.
Figure 7:
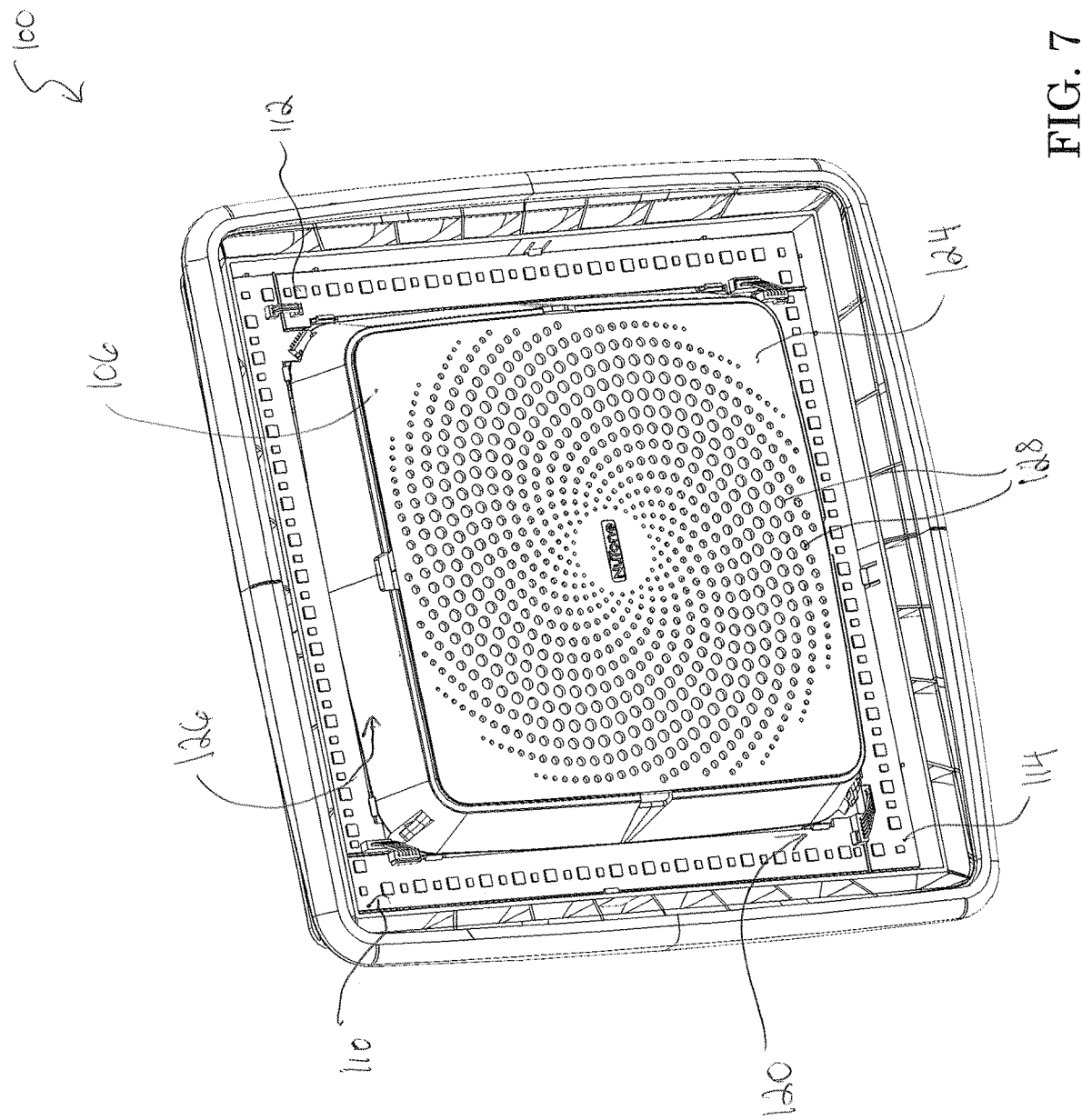
FIG. 7 is an isometric view from below of the grille shown in FIG. 6.
Figure 8:
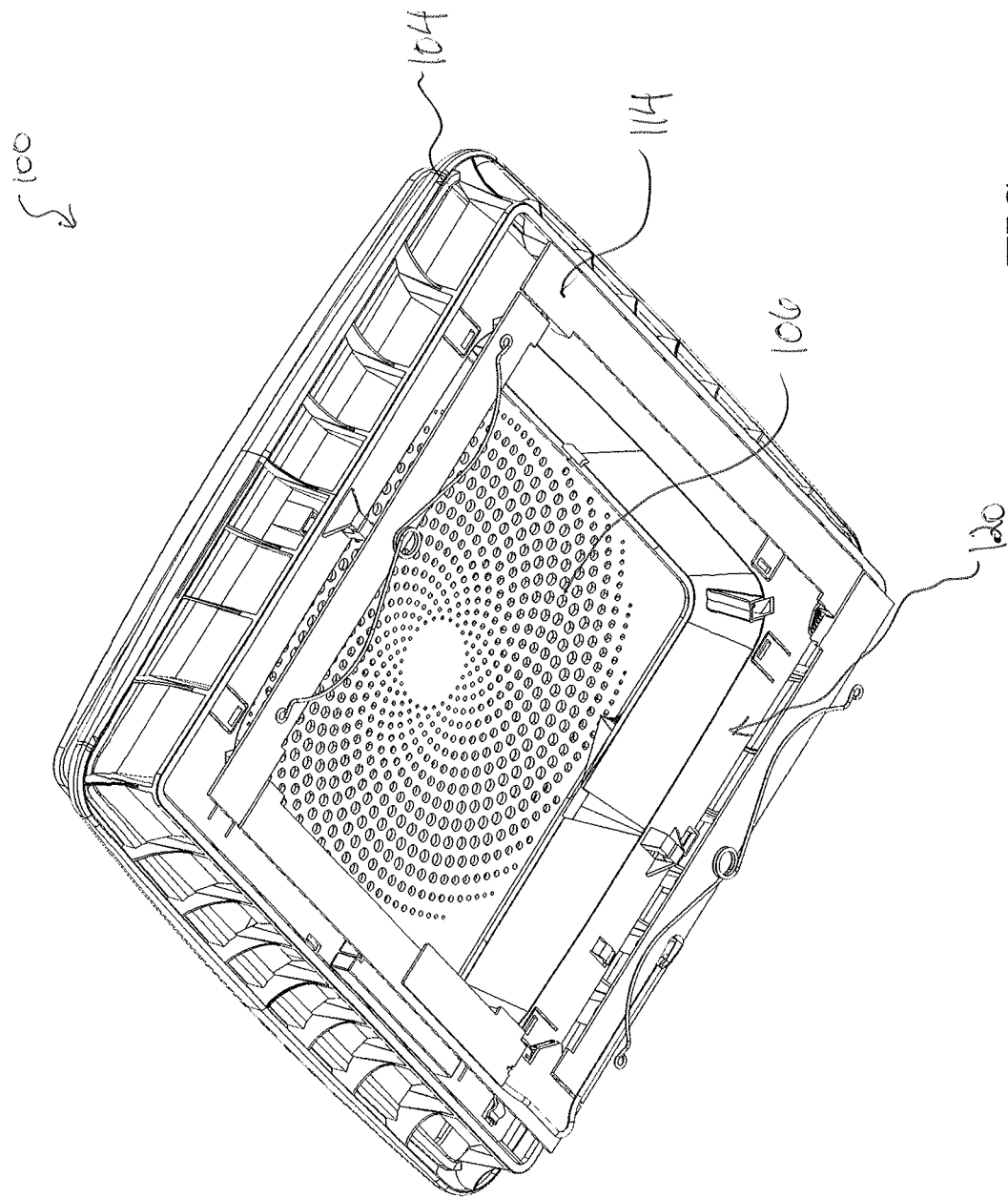
FIG. 8 is a partially exploded isometric view from above of the grille shown in FIG. 6.
Figure 9:
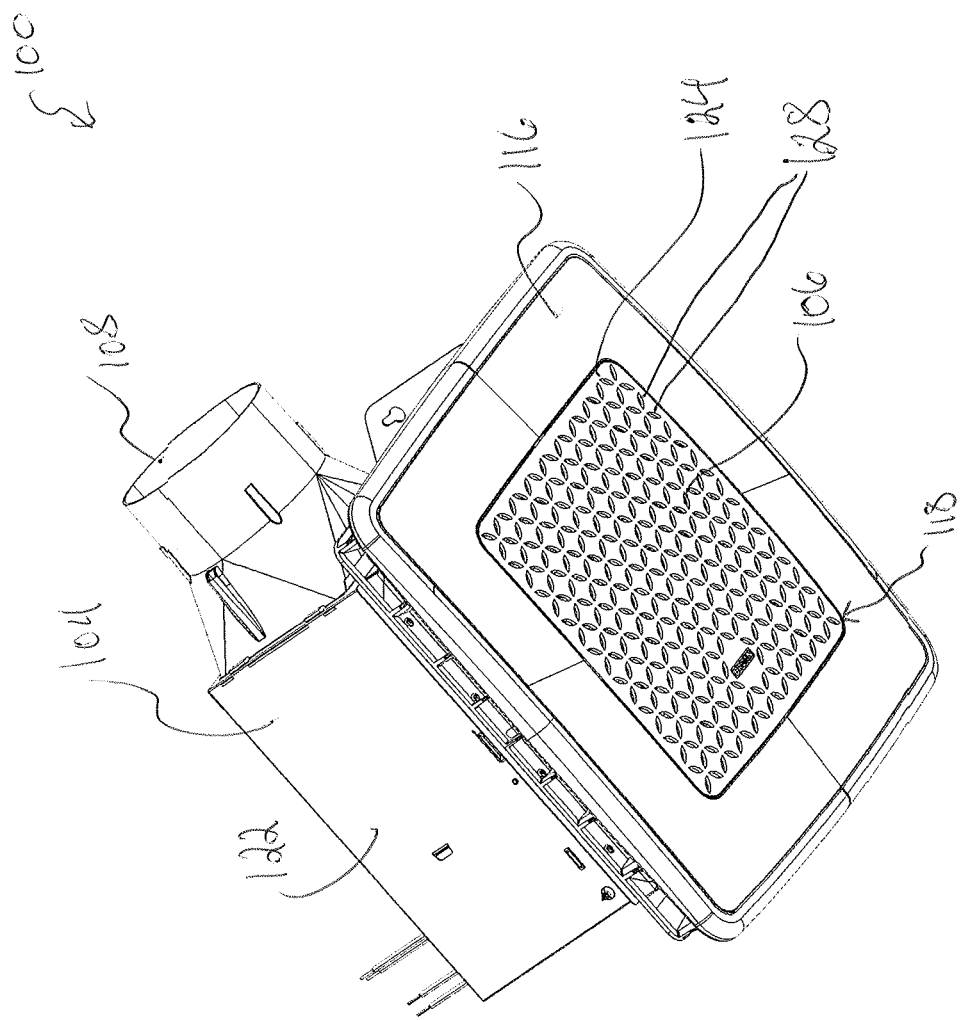
FIG. 9 is an isometric view from below of the ventilation and lighting system of FIG. 1 comprising a second embodiment grille having an aperture pattern different from the grille depicted in FIG. 1.
Figure 10:
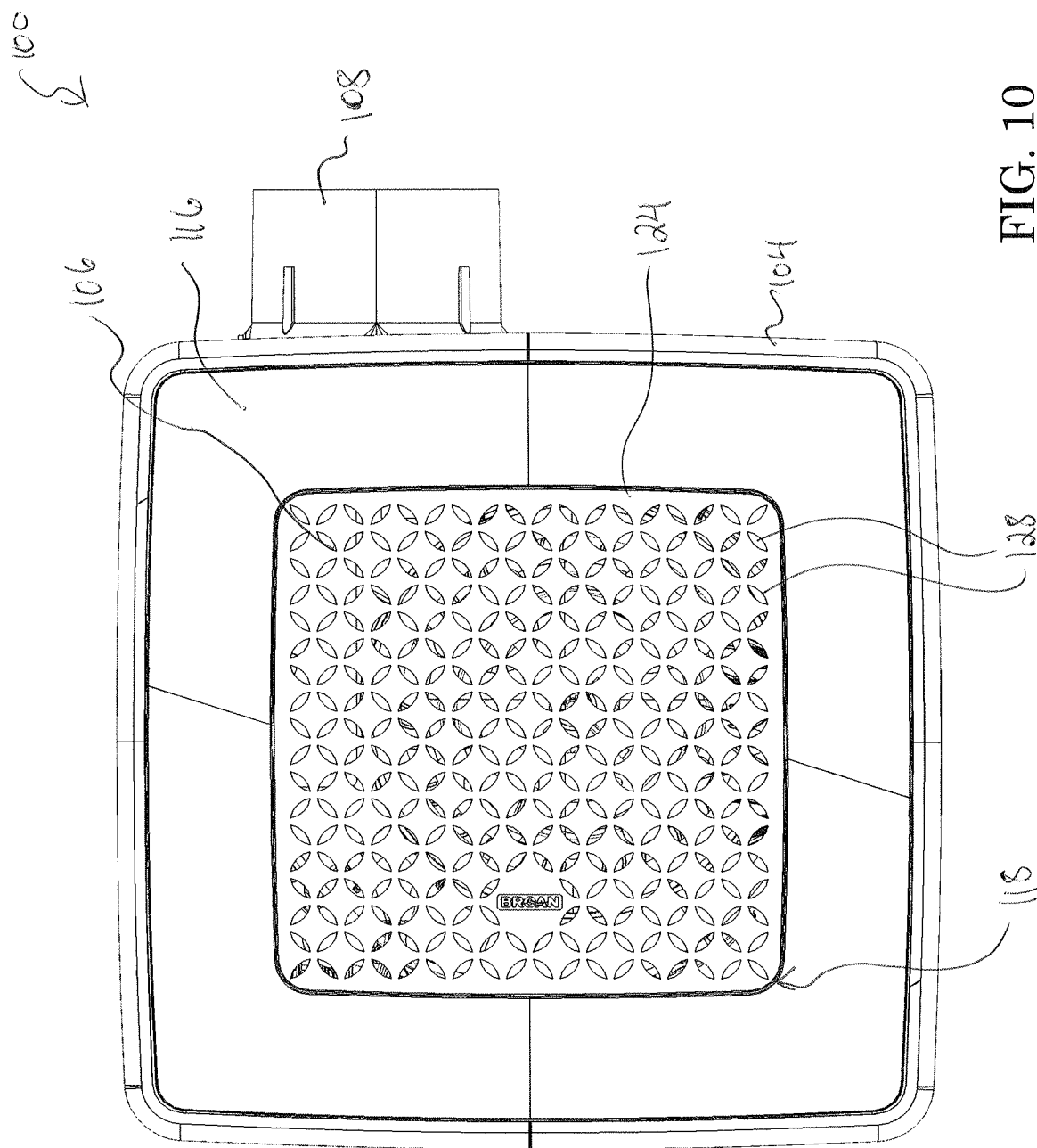
FIG. 10 is a plan view from below of the ventilation and light system of FIG. 9.
Figure 11:
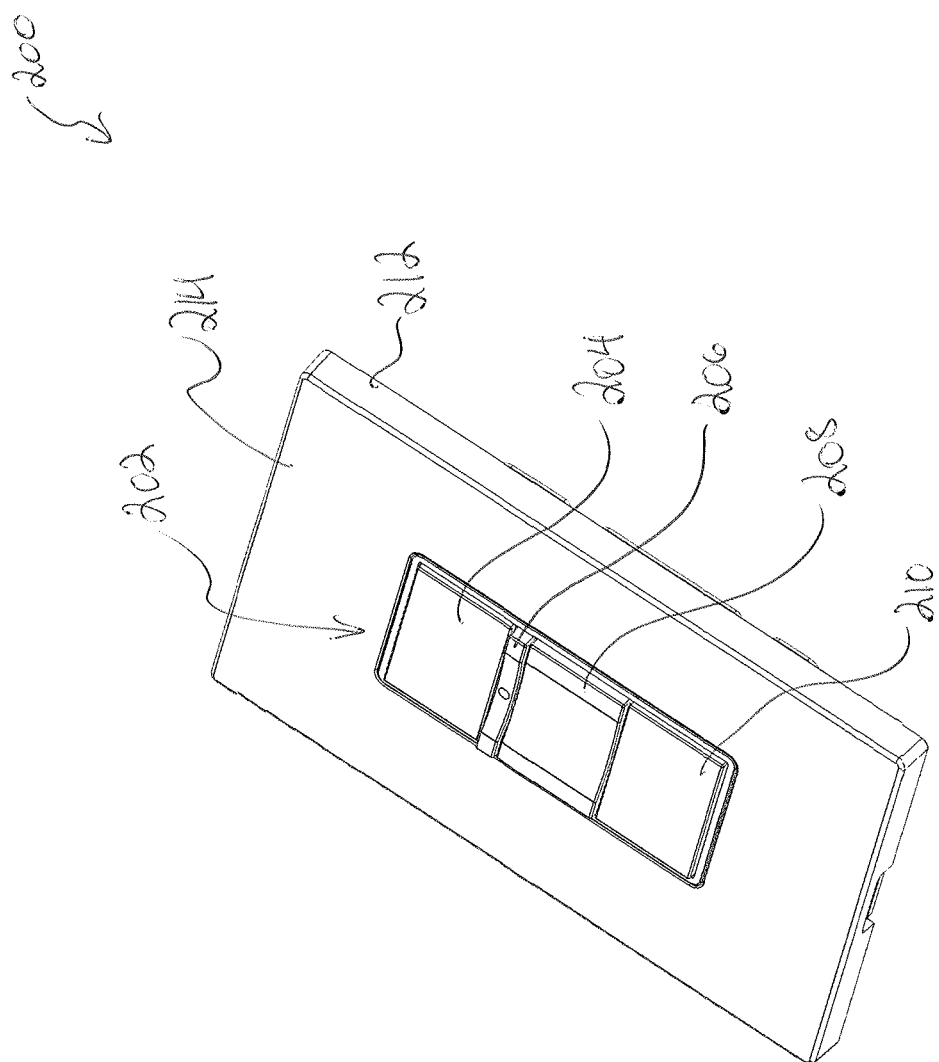
FIG. 11 is an isometric view of a wall-mounted controller for operating the ventilation and lighting systems shown in FIGS. 1-10.

A ventilation and lighting system 100 is described herein with reference to FIGS. 1-10. The ventilation and lighting system 100 (or illuminated ventilation apparatus 100; such terms having been used interchangeably hereinthroughout) comprises a fan 102, a housing 104, a grille 106, a discharge port 108, and one or more lighting elements 110. The one or more lighting elements 110, as shown in FIGS. 6 and 7, are preferably light emitting diodes (LEDs) 112 disposed on one or more printed circuit boards (PCBs) 114. The lighting elements 110 can, however, be any other known lighting elements. The one or more lighting elements 110 direct light through an optical component 116 disposed about the grille 106. In example embodiments, the optical component 116 is an opaque diffuser lens configured as a rounded rectangle with an interior cutout 118 to fit the grille 106 such that the optical component 116 and the grille 106 together form a room-oriented surface of the ventilation and lighting system 100. In the example shown in FIGS. 1-5, 9, and 10, the one or more lighting elements 110 are disposed within a cavity 120 formed within a fan enclosure portion 122 of the housing 104. The cavity 120 is configured as a trough 126 extending adjacent an outer perimeter of the grille 106 defining an interior plate 124 in which a plurality of apertures 128 are defined to allow air to flow through the plate 124. In the depicted embodiments, the optical component 116 is configured to correspond to the shape of the trough 126 so that the optical component 116 encloses the cavity 120 with the one or more lighting elements 110 therein. As a result, light is generated within the cavity 120 and transmitted through the optical component 116 into an adjacent space or room in which the ventilation and lighting system 100 is installed. In other embodiments, the cavity 120 could be comprised of a plurality of discrete cavities located in the grille 106 with each cavity 120 housing one or more lighting elements 110 and having an associated optical component 116. FIGS. 9 and 10 depict another example of the grille 106 comprising a differing pattern of apertures 128 in the central plate 124.

Figure 12:
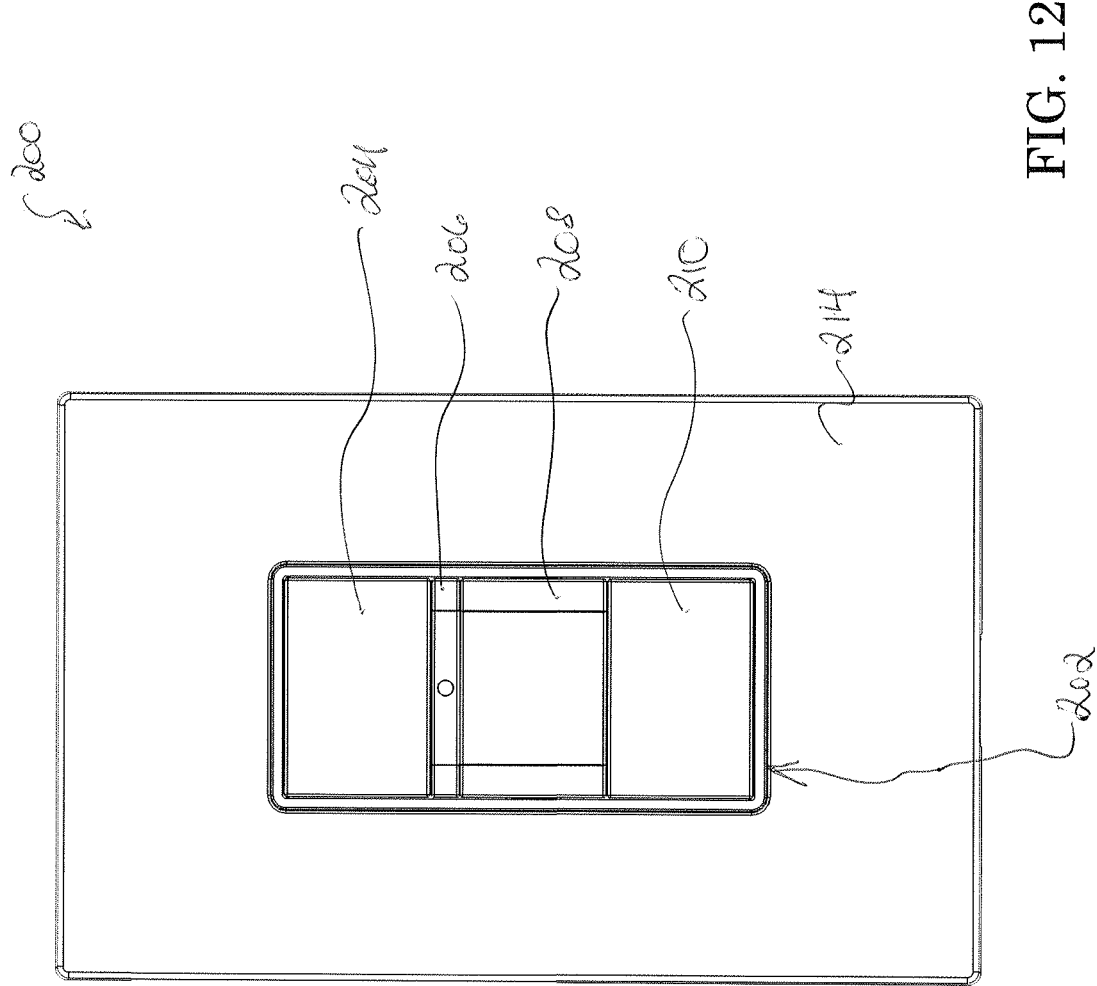
FIG. 12 is an elevational view of the wall-mounted controller of FIG. 11 as same would be mounted within a wall remote from the associated ventilation and lighting systems shown in FIGS. 1-10.

A wall-mounted controller 200 is described herein with reference to FIGS. 11-15. In example embodiments, the wall-mounted controller 200 operates the ventilation and lighting system 100 shown in FIGS. 1-10 according to a control program and/or system 230 shown and described hereinthroughout, but with particular reference to FIGS. 16-37. The control program/system 230 comprises algorithms, processes, logic, and user interfaces for operating the ventilation and lighting system 100 automatically, in response to user inputs, and/or according to pre-programmed functions. FIG. 12 is an elevational view of the wall-mounted controller of FIG. 11 as same would be mounted within a wall and located remote from an associated ventilation and lighting system such as those depicted in FIGS. 1-10. The depicted wall-mounted controller 200 features an arrangement of switches 202. According to an example embodiment, a first toggle 204 controls the functionality of a white light source from among the lighting element(s) 110. A second horizontal toggle 206 vertically aligned beneath the second toggle 204 may implement dimming control for the one or more of the light elements 110. The wall-mounted controller 200 also comprises a third toggle 208 for implementing color control. The third toggle 208 is arranged vertically below and adjacent to the second, dimmer control toggle 206. The third, color control switch 208 may operate according to an on/off function, provide color adjustment, provide color sweep rate adjustment, and/or facilitate scene selection. The third switch 208 may be programming dependent such that in varying examples of the wall-mounted controller 200 the third switch 208 facilitates differing functionality suitable for varying applications of the ventilation and lighting system 100. As a result, the third switch 208 may operate as a toggle or according to another principle. The controller 200 also comprises a fan control toggle 210 arranged vertically below and adjacent to the third switch 208. The fan control toggle 210 adjusts the speed of the fan 102 and/or switch the fan 102 between on and off states. Additionally, a countdown timer may be implemented as a secondary function of any one of the toggle switches 204, 206, 208, 210. For example, depressing one of the switches 202 for a predetermined time period may activate a countdown timer. Also, in examples, depressing different ones of the switches 202 for predetermined time periods may activate countdown timers for different controlled components (e.g. the fan 102, the lighting element(s) 110) or countdown timers of differing length. The countdown timer may operate to switch the fan 102 and/or lighting element(s) 110 between on and off states after a preset time limit. Additionally, the wall-mounted controller 200 provide an intuitive interface for user operation of primary control functions through single momentary actuation and advanced control through sustained actuation of the switches 202 alone and in predetermined combinations.

Figure 13:
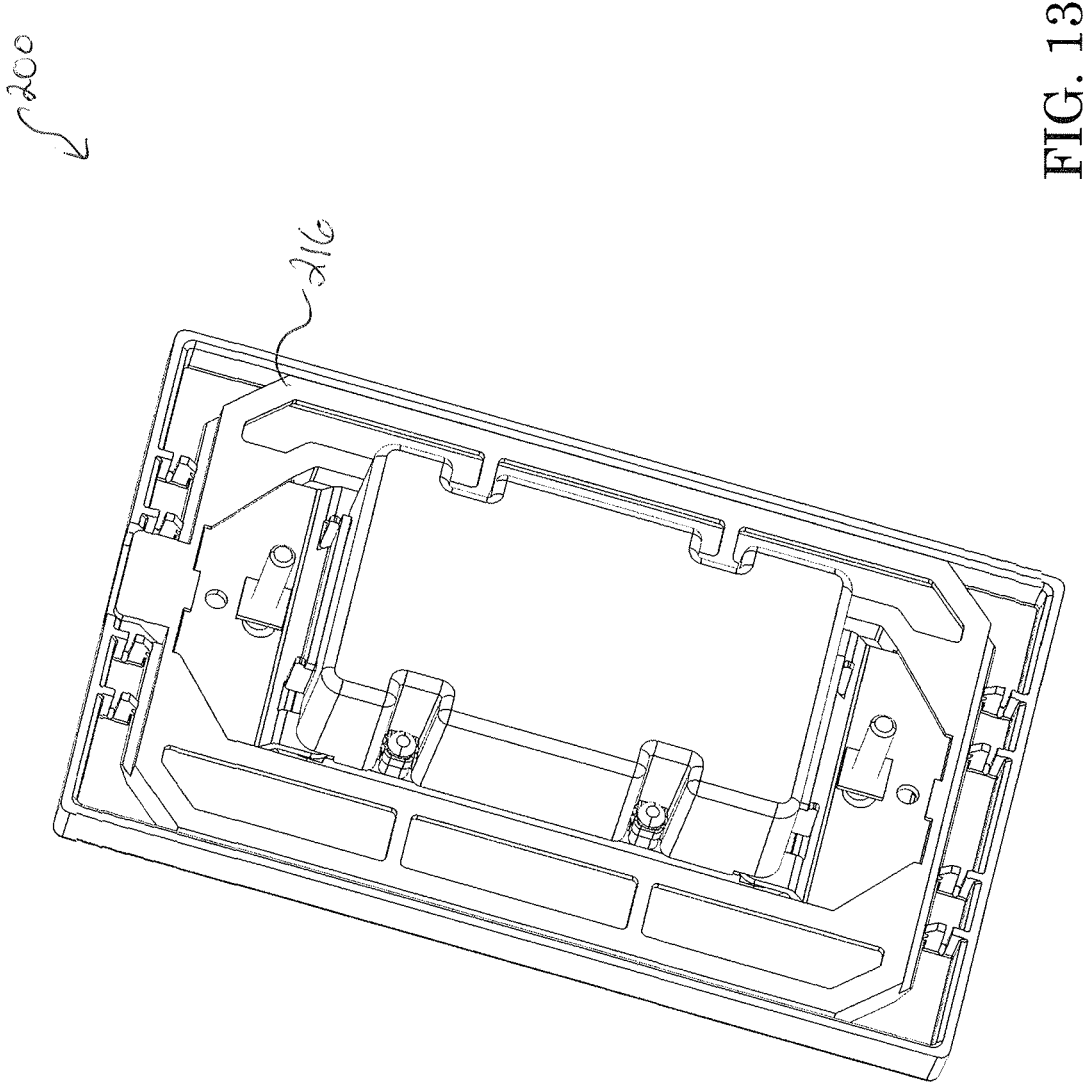
FIG. 13 is an isometric view from behind of the wall-mounted controller of FIG. 11 such that mounting components are shown.
Figure 14:
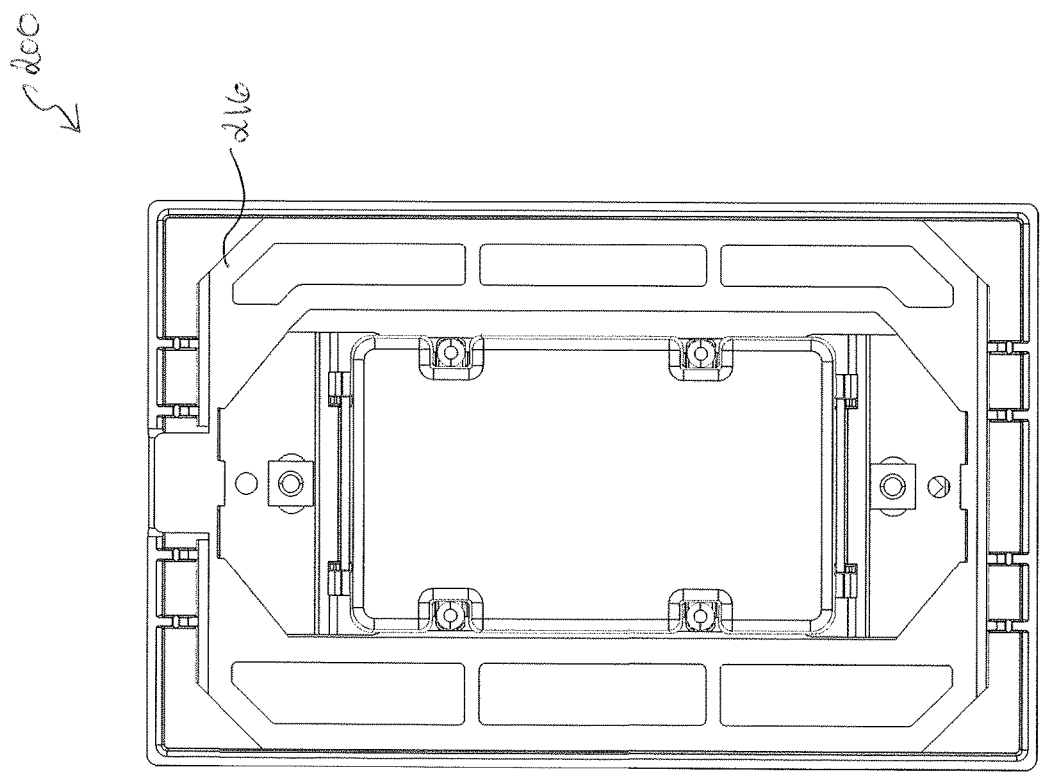
FIG. 14 is a rear elevational view of the wall-mounted controller of FIG. 11.
Figure 15:
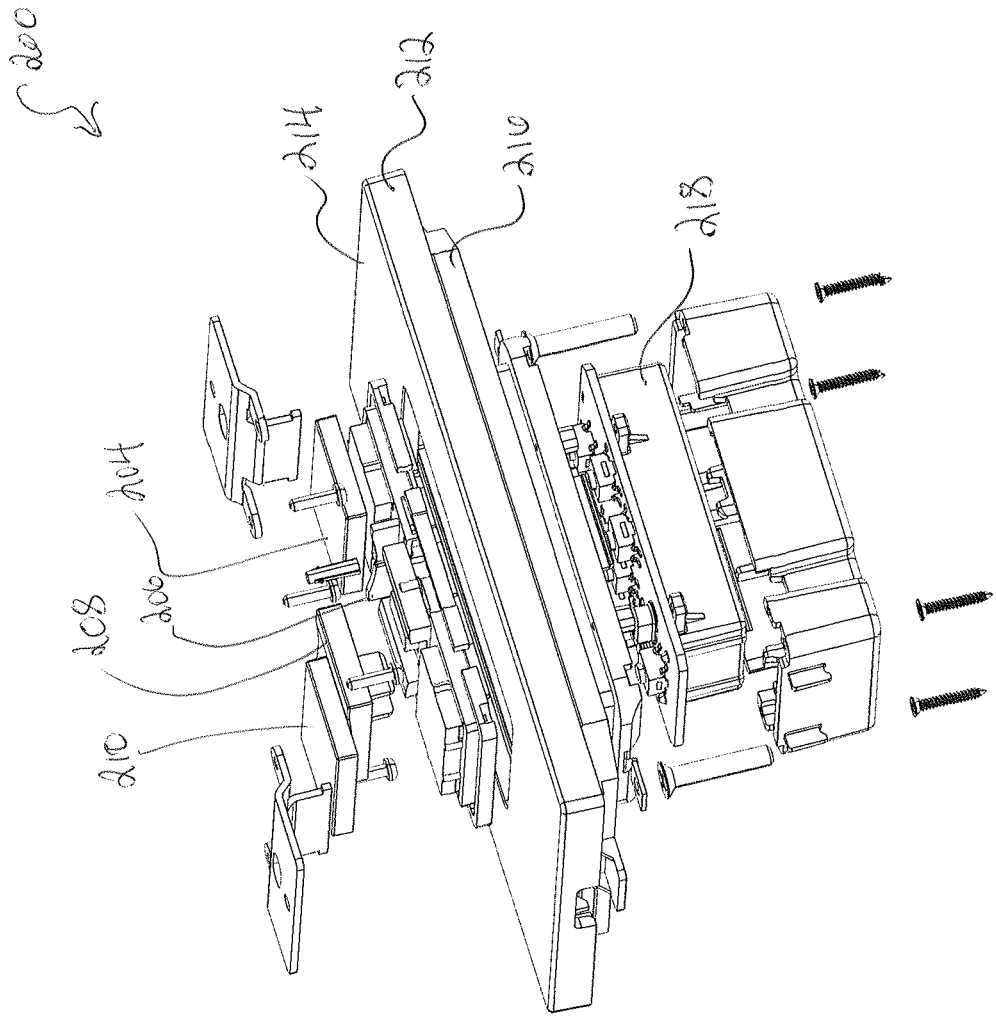
FIG. 15 is an exploded view of the wall-mounted controller of FIG. 11.

FIGS. 13-15 depict one or more mounting components by which the wall-mounted controller 200 may be mounted within a wall and/or ceiling and operatively connected to an electrical source such as 120V grid power, for example, or another suitable power source (e.g., battery, photovoltaic cell, etc.). Internal structural and electrical components of the controller 200 are shown in FIG. 15. The wall-mounted controller 200 includes a housing 212 with a front cover 214 that allows for user access to the switch arrangement 202 and a rear cover 216. The wall-mounted controller 200 further comprises an internal isolation housing 218 that stores a control unit and a battery power source 222. The isolation housing 218 is adapted to isolate the internal components, namely the control unit, from elements in the wall, including live powerlines. In another example embodiment, the battery power source 222 may be omitted and another power source may be substituted therefor, such as a wired connection to grid power.

The isolation housing 218 may be configured to prevent a user from touching live household wiring when accessing the control unit and the other components within the wall-mounted controller 200. The isolation housing 218 also facilitates maintenance of the control unit, which may comprise programming, configuration, upgrading, battery replacement, and/or other desired maintenance of the wall-mounted controller 200. Servicing of conventional switches and controllers may result in the removal of wall plate and mounting flange fasteners when accessing such a control unit. However, the wall-mounted controller 200 contemplated herein may be serviced by removing only the front cover 214.

The ventilation and lighting system 100 further comprises lighting, fan, and chromatherapy control features. The wall-mounted controller 200 described hereinabove may be omitted and replaced with a touch screen interface such as a resistive touch screen, capacitive touch screen, surface acoustic wave (SAW) touch screen, infrared touchscreen optical imaging touch screen, acoustic pulse recognition touch screen, or another suitable interface. In further example embodiments, the arrangement of switches 202 may comprise one or more rocker switches, buttons, spring-loaded toggle switches, and/or other suitable switches. Referring to FIGS. 16-37, the control program 230 is implemented through one or more user interfaces 400. The control program 230 may operate to control and/or manage the ventilation and lighting system 100 independent of, or in conjunction, with the wall-mounted controller 200 detailed hereinabove. Depending upon particular applications and/or inputs, either of the one or more user interfaces 400 or the wall-mounted controller 200 may take precedence when conflicting control inputs are received. Further, the control program 230 may coordinate and/or synchronize control of the illuminated ventilation system 100 in response to both the wall-mounted controller and the one or more user interfaces 400.

The ventilation and lighting system 100 may comprise built-in sensors, such as optical sensors to detect ambient light, motion sensors (e.g., passive infrared, microwave, ultrasonic, area reflective type, vibration), timers, moisture/humidity sensors, and/or other suitable sensors for assisting and enhancing control of the system 100 by the control program 230. Such sensors may be utilized by the control program 230 to suggest a specific chromatherapy protocol, suggest a scene, or otherwise as inputs to the control program 230.

The one or more lighting elements 110 disposed within the ventilation and lighting system 100 develop a plurality of lighting characteristics. In example embodiments, the one or more lighting elements 110 may develop different colors and intensities of light. Further, the lighting element(s) 110 may emit different colors and/or intensities of light, such as with color LEDs. As shown in FIGS. 6-8, the lighting elements 110 are directed downward and away from the fan enclosure and towards the optical component 116, when the ventilation and lighting system 100 is installed in a horizontal room surface, such as a ceiling. The present disclosure contemplates the lighting element(s) 110 comprising white and RGB LEDs (i.e., including red, green, and blue emitters). Further example embodiments may comprise RGBW LEDs (i.e. red, green, blue, and white emitters), RGBWW LEDs (i.e., red, green, blue, and warm-white emitters; temperature controlled white color), and/or other suitable LEDs or combinations of LEDs. In example embodiments, the LEDs 112 may be individually addressable or addressable as one or more strips. The one or more addressable strips of LEDs 112 may correlate to first, second, third, and fourth sides of the illuminated ventilation apparatus 100 or first, second, third, and fourth PCBs 114.

The cavity 120 wherein the lighting element(s) 110 are disposed may facilitate light and/or color mixing before the mixed light travels through the optical component 116 disposed about the grille 106. The optical component 116 may further facilitate light mixing via scattering, diffusing, and/or other light mixing techniques. The optical component 116 may be an opaque diffuser lens or another optical waveguide with one or more mixing, diffusing, and/or light redirecting properties according to example embodiments of the ventilation and lighting system 100. According to an example embodiment, the optical component 116 allows some of the light to transmit therethrough while forcing some of the light to reflect within the cavity 120 between the optical component 116 and a bottom surface of the fan enclosure 122. In another example, the one or more lighting elements 110 may direct light towards the fan enclosure 122 and, initially, away from the optical component 116. According to this example, a bottom surface of the fan enclosure 122 may be reflective such that light is reflected thereby, mixes within the cavity 120, and then exits the cavity 120 through the optical component 116. Reflective material, paint, and/or coating may be suitable applied within the cavity 120, such as on a bottom surface of the fan enclosure 122, to further facilitate light and/or color mixing. This configuration may develop adequate light and/or color mixing so that a diffuser lens may be omitted.

The ventilation and lighting system 100 may include a communications module for transmitting and receiving signals from the wall-mounted controller 200 and/or mobile device 232 executing the control program 230. For example, the communications module may implement wireless communications according to known protocols such as Bluetooth, Wi-Fi, Zigbee, infrared, dedicated control wiring, signal-over-power, and/or other suitable protocols to communicate with the wall-mounted controller 200 and/or mobile device 232.

The signals that are received by the communications module may be processed by one or more processors associated with the ventilation and lighting system 100. For example, a microprocessor may regulate the current applied to the one or more lighting elements 110 or may operate a subset of the lighting element(s) 110 as directed by the control program 230. It should also be understood that the microprocessor may use further operate to dim the lights, control flicker of the lights, and/or change other properties of the lighting element(s) 110 and/or emitted light according to instructions supplied by the control program 230. The processor may be associated with one or more memory elements of the ventilation and lighting system 110.

User inputs received by the wall-mounted controller 200 and/or the control program 230 may determine one or more of color, hue, duration, and/or light intensity according to a variety of control schemes. Likewise, user inputs may determine the run-time, power, and/or other operational qualities of the fan 102. Control sequences may be defined to follow a sweeping pattern of colors according to the preferences of a user. Alternatively, color patterns may be cycled randomly. Control sequences may be defined to produce complementary hues and intensities according to orders/series that are known to encourage vitality or relaxation. Many desirable sequences may be developed according to chromatherapy protocols or other user criteria such as mood lighting, guest lighting, night lighting, emergency lighting, lighting for showing a home/room, etc. Additionally, the color capabilities of the lighting element(s) 110 may include monochrome or combinations of white, violet, indigo blue, aqua blue, green, yellow, orange, red, and/or other colors. The control program 230 operating in conjunction with the wall-mounted controller 200 and/or the mobile device(s) 232 provides for soft transition from one color to another in a predefined series. According to particular control schemes, the lighting and ventilation qualities of the ventilation and lighting system 100 are coordinated to develop one or more scenes or protocols. In example embodiments, the control program 230 executed by the one or more mobile devices 232 may be synchronized with the wall-mounted controller 200. Also in examples, voice control may be integrated into the control program 230 via the one or more mobile devices 232 and/or the wall-mounted controller 200.

Figure 16:
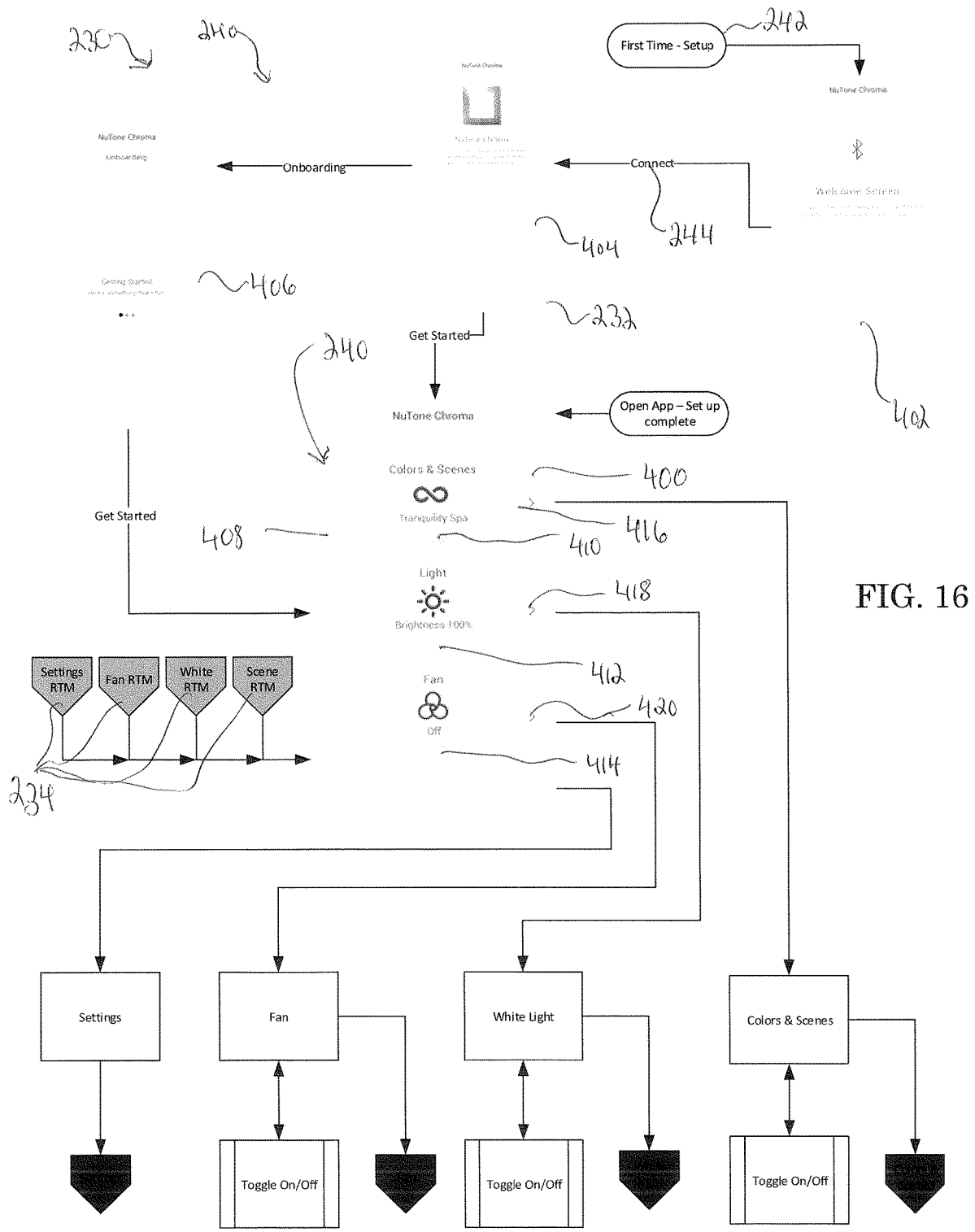
FIG. 16 is a control diagram illustrating setup and operation of a control program for managing the ventilation and lighting systems shown in FIGS. 1-10.

Referring now to FIGS. 16-21, control processes 240, 260, 280, 300, 320, and 340 of the control program 230 are described along with associated ones of the user interface(s) 400. FIG. 16 is a control diagram illustrating "setup" and "home" processes 240 of the control program/system 230 for managing the ventilation and lighting system 100 shown in FIGS. 1-10. User interfaces 402, 404, 406 are encountered by a first time user during setup of the control program/system 230. At step 242, a user opens the control program 230 and follows the instructions of the welcome user interface 402. In response to the instructions of the welcome user interface 402, a user connects (such as by Bluetooth™) the mobile device 230 to the ventilation and lighting system 100 during step 244. Following connection, a user encounters the first and second "setup" user interfaces 404, 406. The control program 230 may automatically configure the mobile device 232 and the illuminated ventilation system 100 or the user may be prompted to undertake additional initialization steps. Following initialization and setup, a user is presented with a "home" user interface 408. The "home" user interface 408 comprises virtual buttons 410, 412, 414, 416, 418, 420 associated with differing control functionality. The virtual toggle buttons 410, 412, 414 toggle their respective functions between on and off states. The virtual toggle 410 adjusts the fan 102 between on and off states; the virtual toggle 412 adjusts a white light subset of the lighting element(s) 110 between on and off states; and the virtual toggle 414 adjusts scene and color control between on and off states. As a result, the virtual toggle 414 adjusts one or more particular color-producing subsets of the light element(s) 110 (as directed but a default or previously determined scene or color selection).

Additionally, the virtual toggles 410, 412, 414 are overlaid onto the virtual buttons 416, 418, 420 for accessing advanced controls for each of the elements respectively controlled by the toggles. The virtual button 416 implements user access to advanced color and scene control. The virtual button 418 for the white subset of lighting element(s) 110 implements user access to brightness control (e.g., a virtual slider for dimming or increasing brightness along a 0%-100% scale). Further, the virtual button 420 implements user access to advanced fan control (e.g., control of fan speed and/or duration). Each of the virtual buttons 410-420 is monitored in real time by real-time monitoring sensors 234 disposed within a touchscreen of the one or more mobile devices 232.

Figure 17:
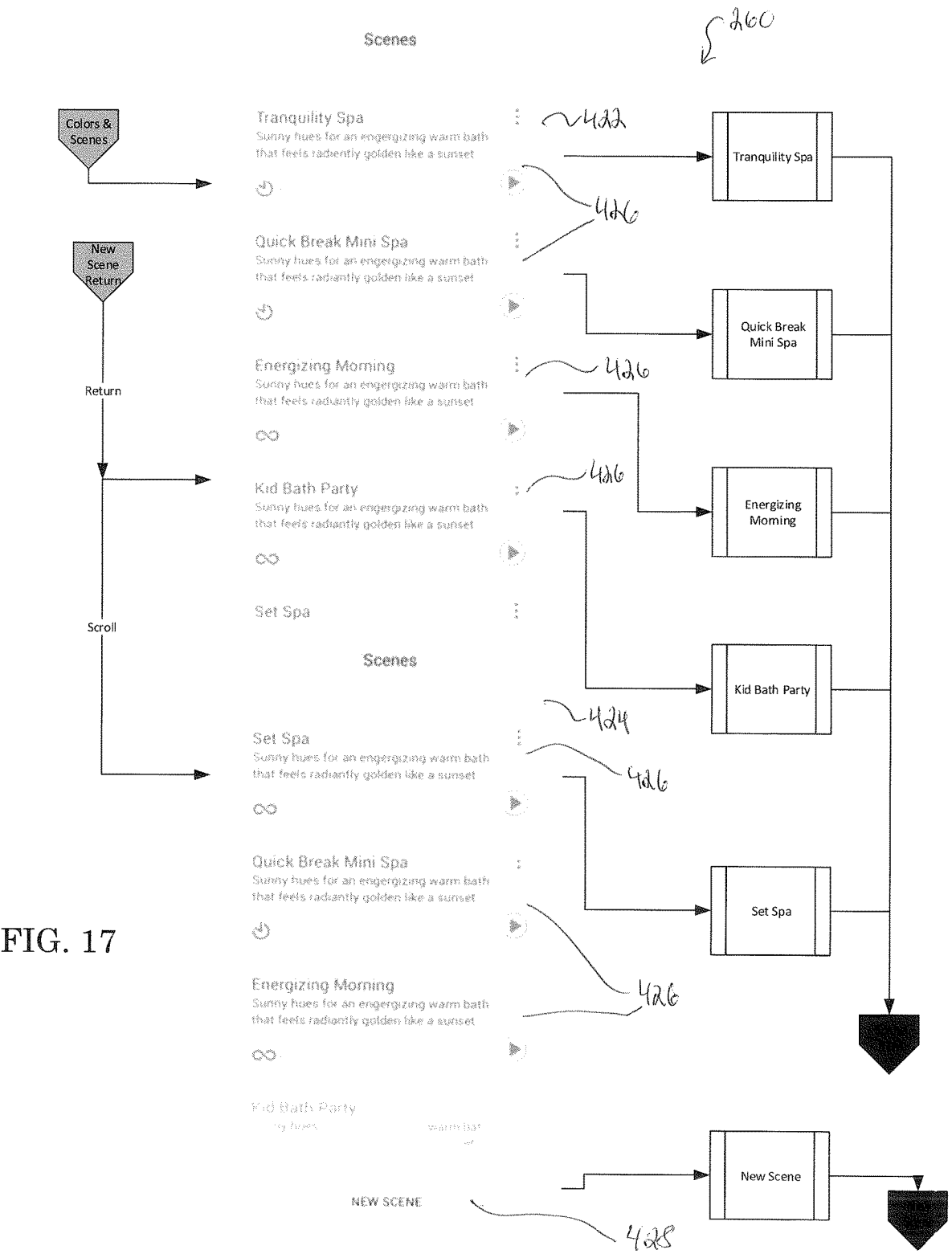
FIG. 17 is a control diagram illustrating scene control for managing the ventilation and lighting systems shown in FIGS. 1-10.

Referring now to FIG. 17, the control process 260 illustrating advanced scene control presents a user with scene control user interfaces 422, 424. A plurality of scene selection virtual buttons 426 are integrated into the scene control user interfaces. Each of the scene selection virtual buttons 426 initiates a scene when selected by a user. A scene comprises coordinated lighting control, color control, and fan control designed in temporal synchronization to evoke particular user sentiments. Example scenes shown in FIG. 17 include "Quick Break Mini Spa", "Energizing Morning", and "Kid Bath Party". Numerous qualities of the lighting control described hereinthroughout (e.g., sweep rate, correlated color temperature, color, hue, intensity, timing, saturation, etc.) may be optionally integrated within each scene. The multi-color, adjustable LED lighting elements 112 may be controlled and preset for particular times of day, activities, or desired moods to enhance user enjoyment thereof. In example embodiments, software may automatically select light colors to compensate for time of day, season, weather, and/or a number of other suitable factors. Also, a user may preselect light hues to accentuate interior design and/or other room elements. One or more sensors may be incorporated into the system 100 for gathering information concerning one or more factors as an input to the control program 230. The light color and chromaticity control may be determined by the quality of the lighting element(s) 110 and/or by algorithms defined through software. Further, the runtime and power of the fan 102 (measurable by cubic feet per minute (CFM)) may be manipulated by the user and/or incorporated into pre-programed or user generated scenes.

The scene control user interface 424 further comprises a scene settings virtual button 428. When a user selects the scene settings virtual button 428, the settings integrated into each scene may be manipulated by a user. Further, through this interface a user may generate a new scene comprising ventilation and lighting features selected according to the preferences of a particular user.

Figure 18:
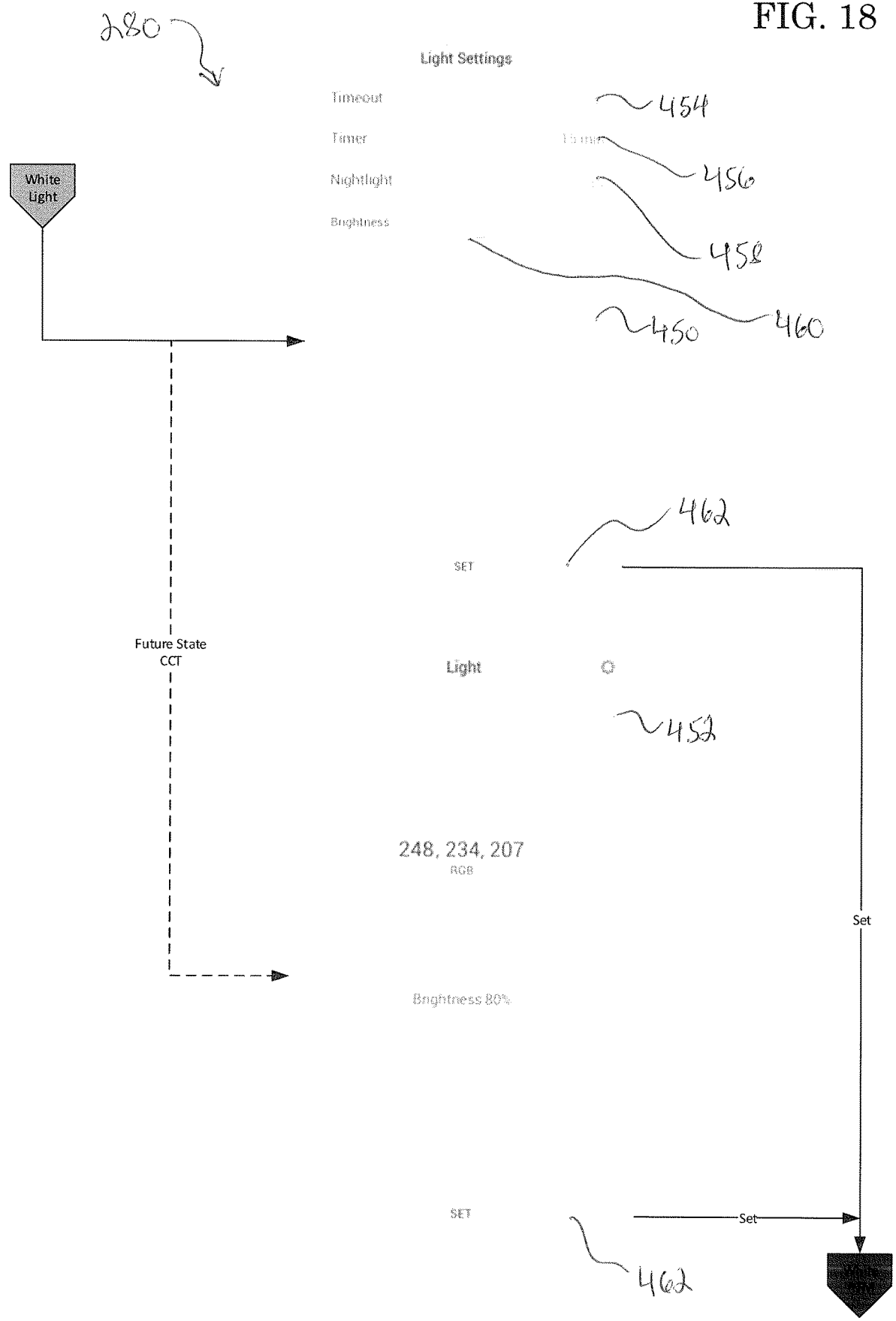
FIG. 18 is a control diagram illustrating lighting settings control for managing the ventilation and lighting systems shown in FIGS. 1-10.

FIG. 18 depicts the control process 280 for accessing and manipulating settings for the lighting element(s) 110. Advanced lighting control user interfaces 450, 452 comprise virtual buttons and virtual toggles. Lighting control user interface 450 comprises settings for adjustment of a white light subset of the lighting element(s) 110. These include a "timeout" virtual toggle 454, a virtual timer selection button 456, a nightlight virtual toggle 458, and a brightness virtual slider 460. A virtual "set" button 462 saves settings selected with the other virtual buttons of the light control user interface 450. The lighting color control user interface 452 comprises a correlated color temperature virtual slider 462 having an arcuate shape or depicted as a color wheel. Additionally, a current or selected correlated color temperature is displayed below the correlated color temperature virtual slide 462 in the form of a red, green, blue (RGB) color code. Three numbers represent absolute values for the intensity of red, green, and blue light emitted by the one or more lighting elements 110. The RGB color code may correlate directly to the intensity and number of red, green, and blue LEDs powered. Alternatively, conversions may be performed by the underlying control program 230 for calculating the RGB color code produced by LEDs of different colors or color-shifted LEDs. This user interface 452 may further comprise the brightness virtual slider 460.

Figure 19:
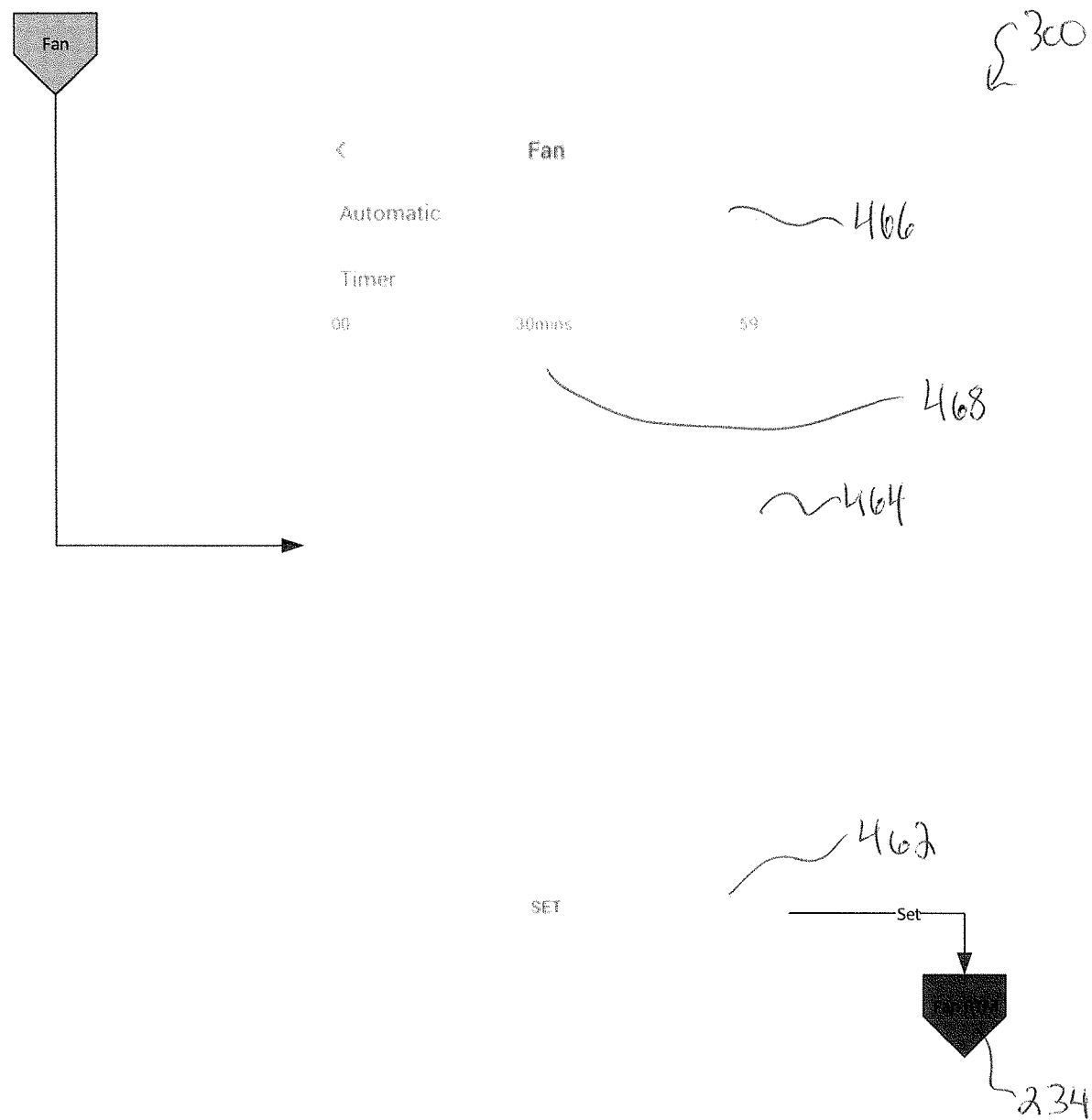
FIG. 19 is a control diagram illustrating fan control for managing the ventilation and lighting systems shown in FIGS. 1-10.

The fan control process 300 and a user interface 464 therefor are shown in FIG. 19. The fan control user interface 464 comprises an automation virtual toggle 466 and a timer virtual slider 468. The automation virtual toggle 466 switches an automatic fan setting between on and off states. In the on state, the fan 102 vents air into a subject room according to an automatic process (e.g., periodic interval, humidity detection, etc.). The timer virtual slider 468 allows a user to slide a virtual button to a number of minutes of ventilation desired (e.g., in the example shown in FIG. 19, the timer virtual slider 468 indicates a selection of thirty minutes of fan run time.

Figure 20:
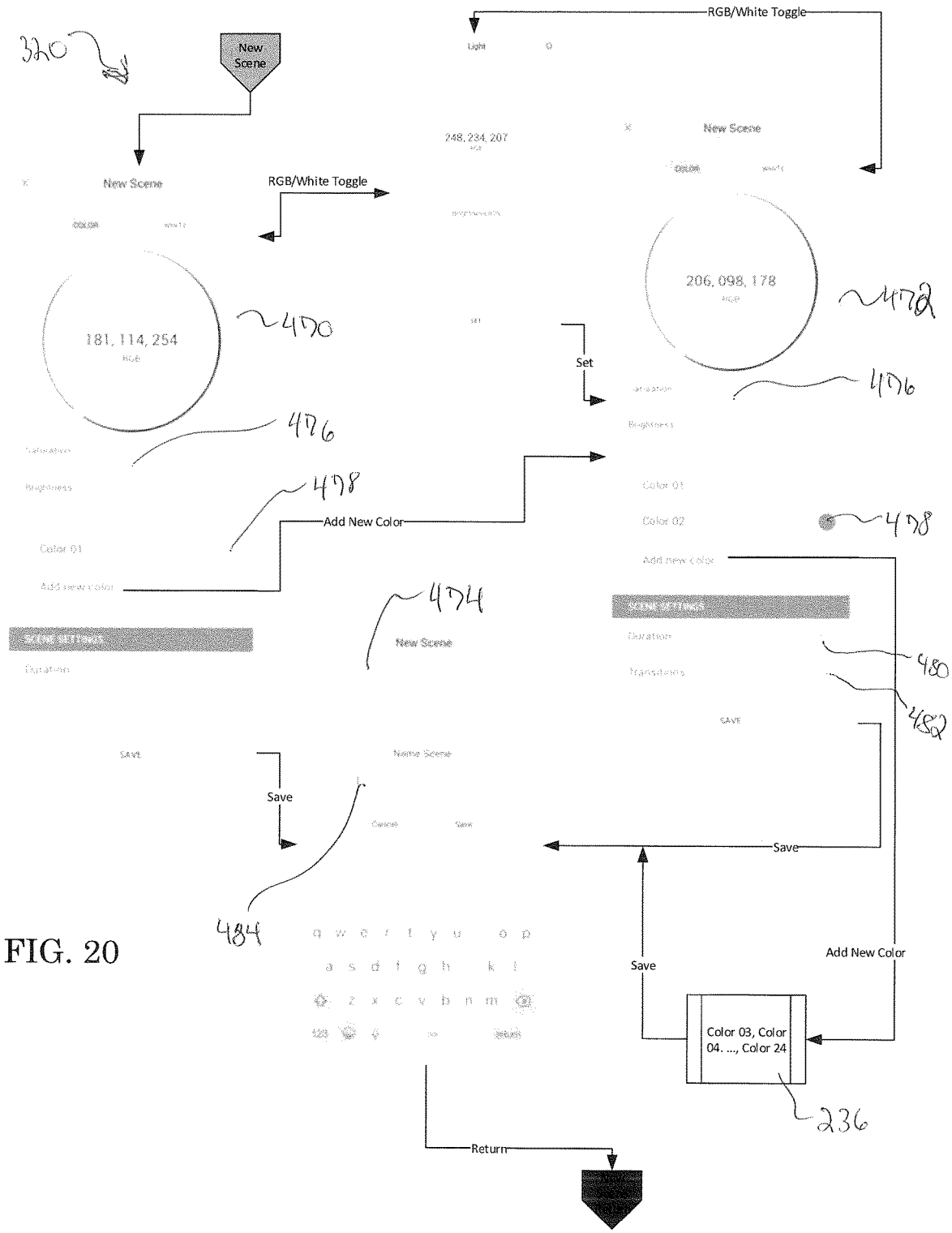
FIG. 20 is a control diagram illustrating new scene generation for managing the ventilation and lighting systems shown in FIGS. 1-10.

FIG. 20 the scene generation process 320 presents a user with scene generation user interfaces 470, 472, 474. The scene generation user interface 470 is similar to the lighting control user interface 450, but further includes a saturation virtual slider 476 and one or more virtual radio buttons 478 for selecting and storing a particular color in a hierarchical order for production of a scene. The scene generation user interface 472 further includes first and second virtual buttons 480, 482 for selecting the duration of a color and the desire transition from one stored color setting to the next (e.g., calm, abrupt, steady, etc.). The scene generation user interface 474 provides a text capture box 484 for naming a newly generated scene. The newly generated scene may be stored in a memory module 236 disposed within the one or more mobile devices 232, the wall-mounted controller 200, remotely (such as on a cloud server), and/or physically within the housing 104 (e.g., on the one or more PCBs 114) of the illuminated ventilation apparatus 100.

Figure 21:
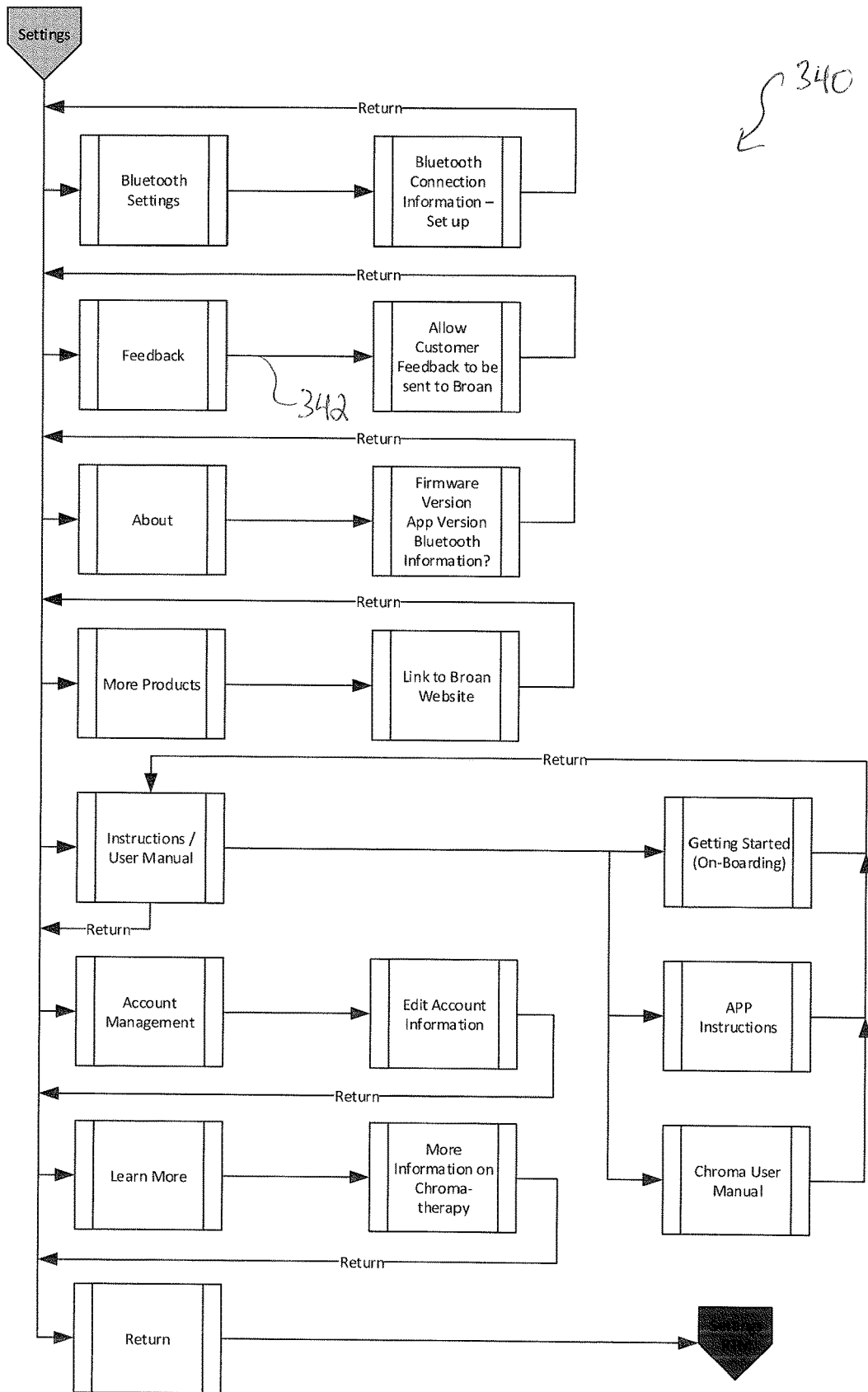
FIG. 21 is a control diagram illustrating settings and feedback control for managing the ventilation and lighting systems shown in FIGS. 1-10.

FIG. 21 is a control diagram illustrating a feedback process 340 that provides feedback in connection with the ventilation and lighting system 100. At step 342, a user may send feedback to a developer of the control program 230 and user interfaces.

Figure 22:
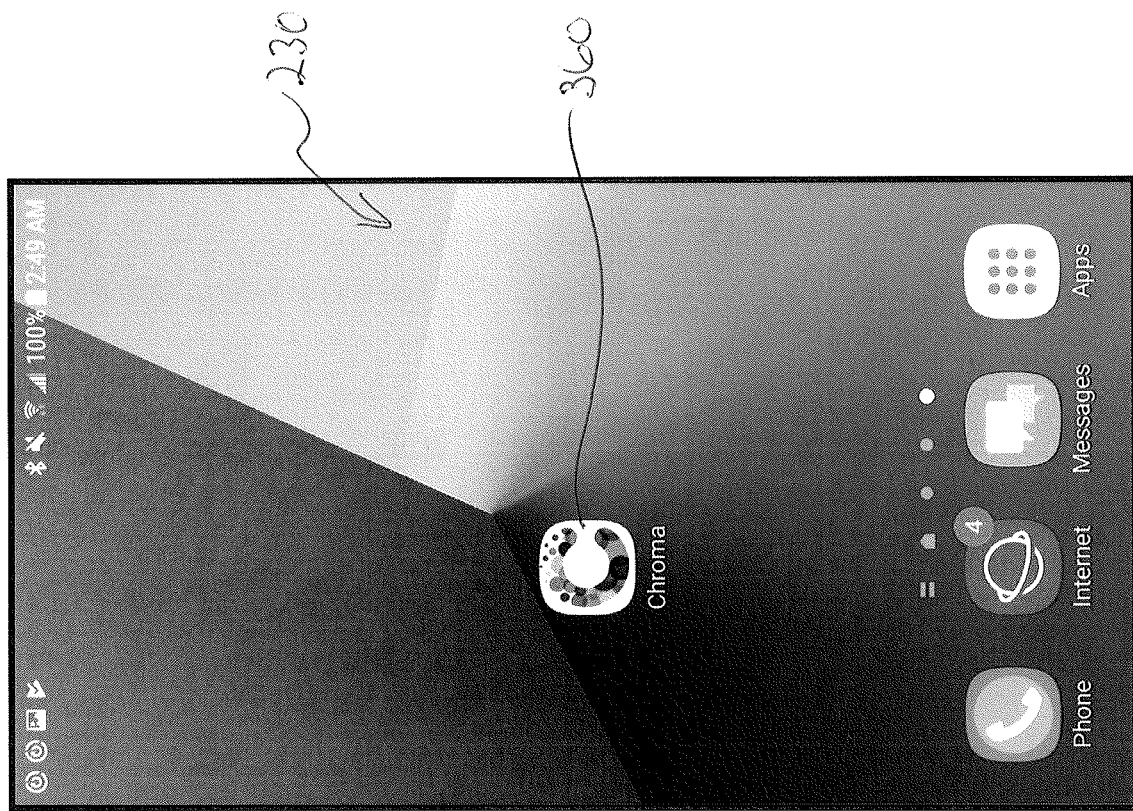
FIG. 22 depicts a mobile application icon for initializing an example control program, such as the control program detailed with reference to FIGS. 16-21, through a mobile device userinterface.
Figure 23:
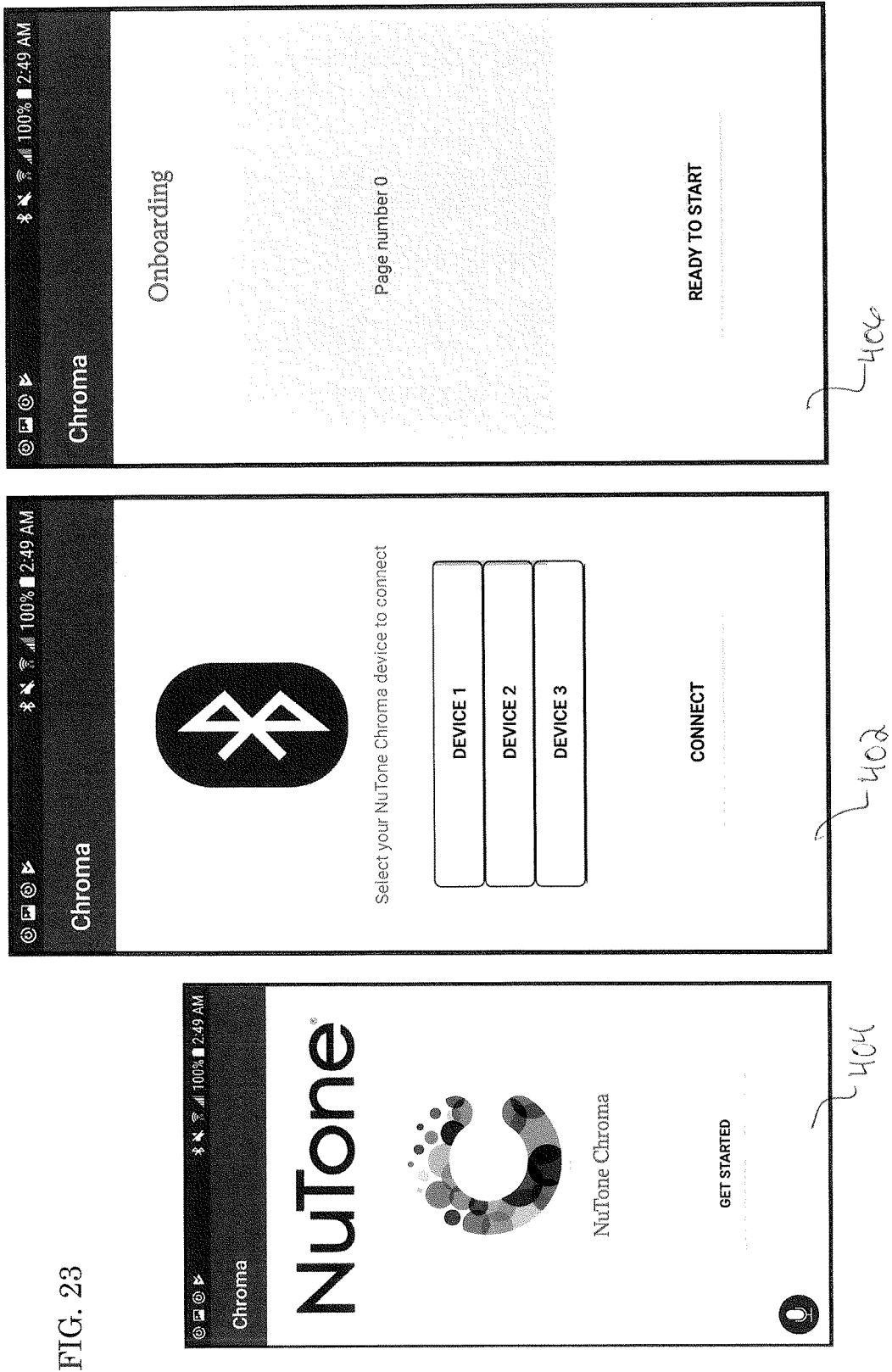
FIG. 23 depicts "welcome" and "setup" user interfaces of an example of the control program of FIG. 22.
Figure 24:
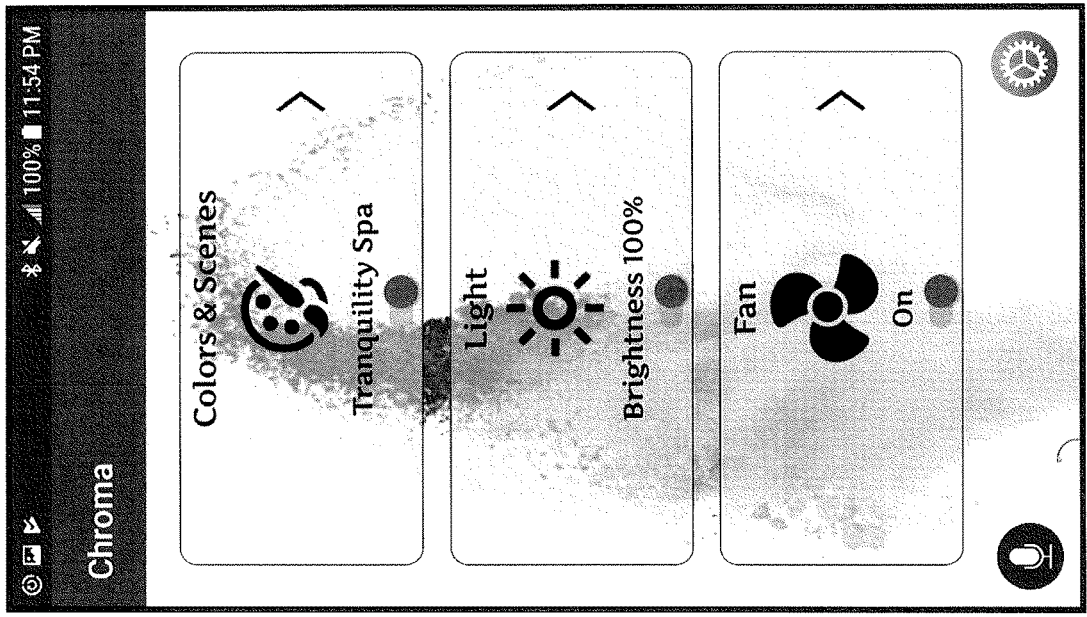
FIG. 24 depicts a menu screen of the control program of FIG. 22.
Figure 24:
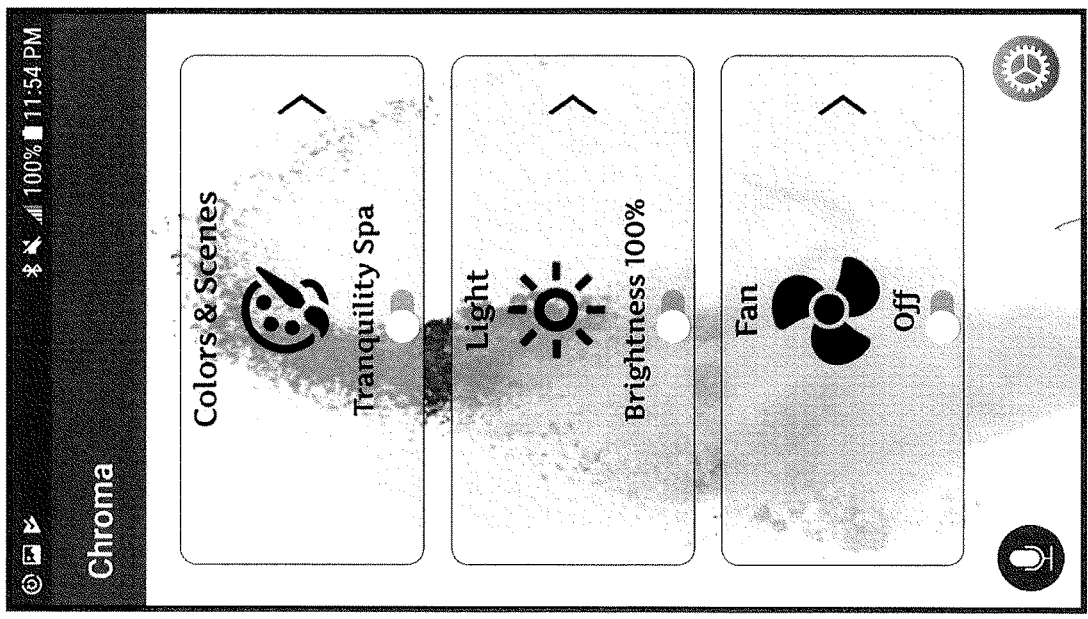
Figure 25:
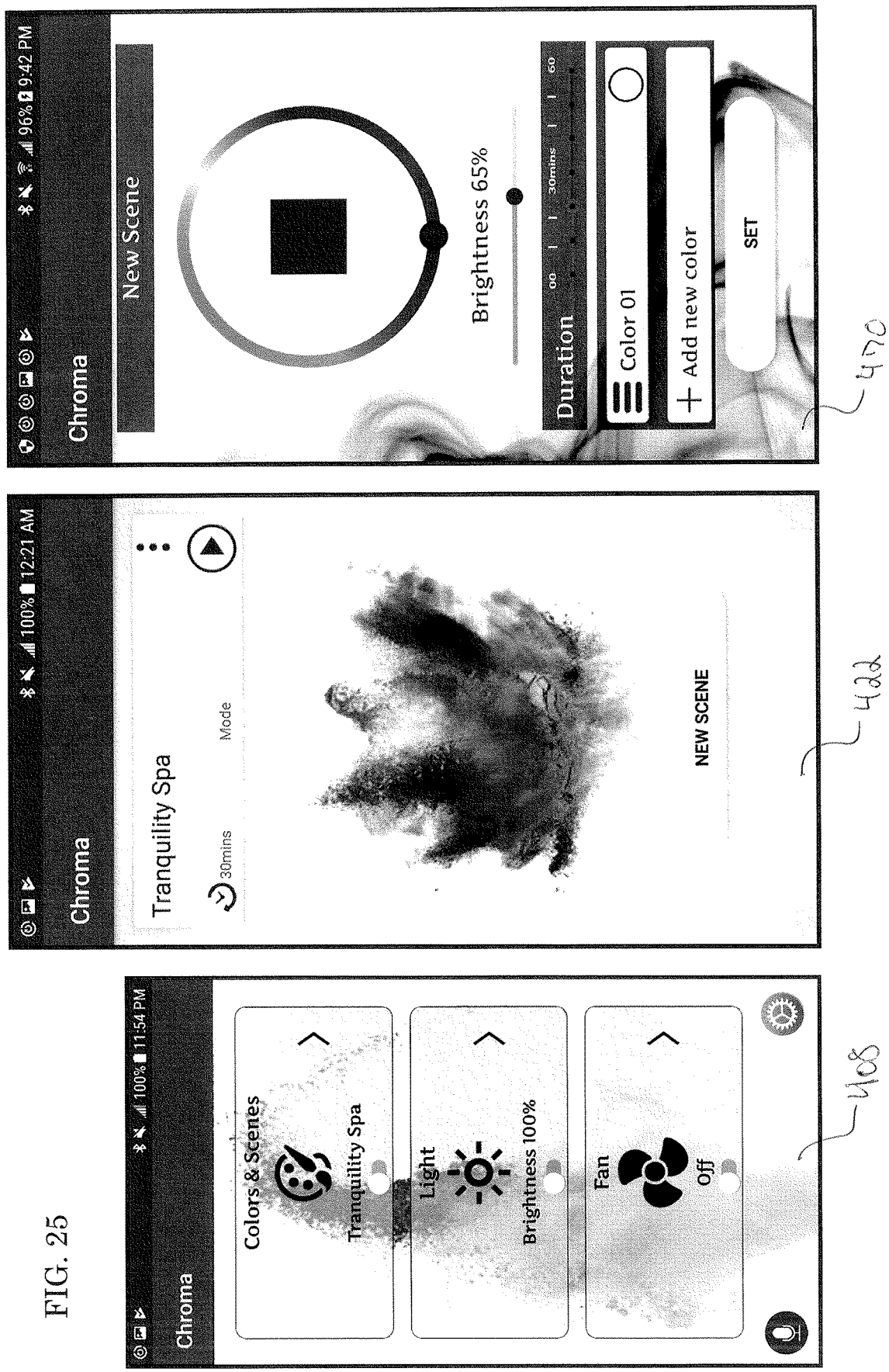
FIG. 25 depicts user interfaces for generating a new scene with the control program of FIG. 22.
Figure 26:
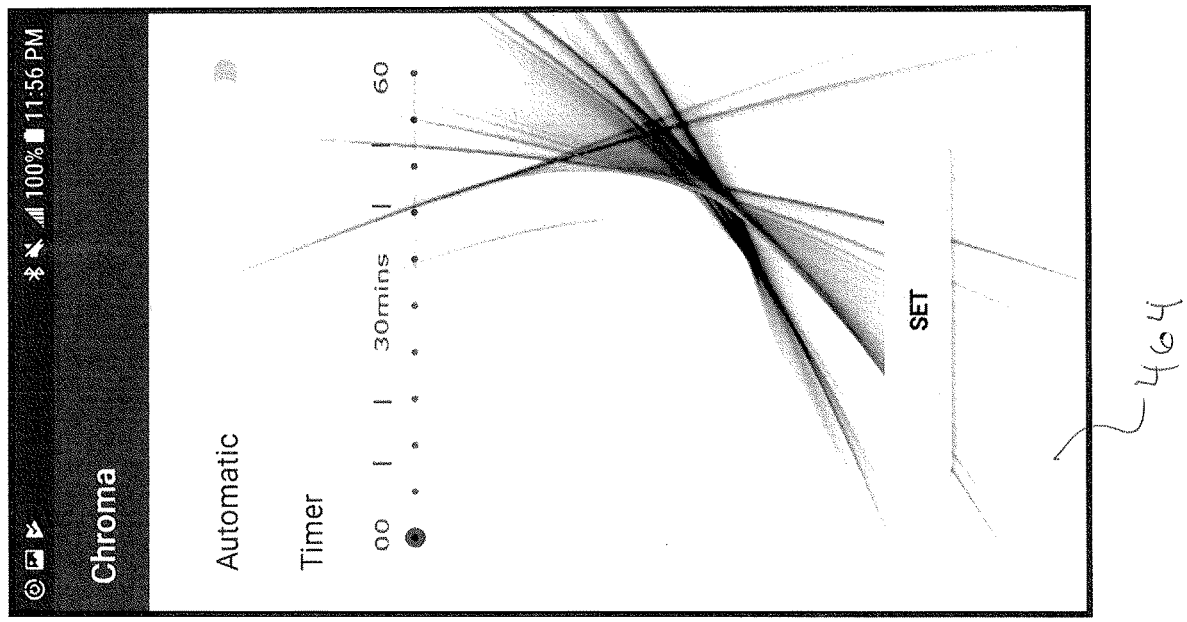
FIG. 26 depicts fan control user interfaces of the control program of FIG. 22.
Figure 26:
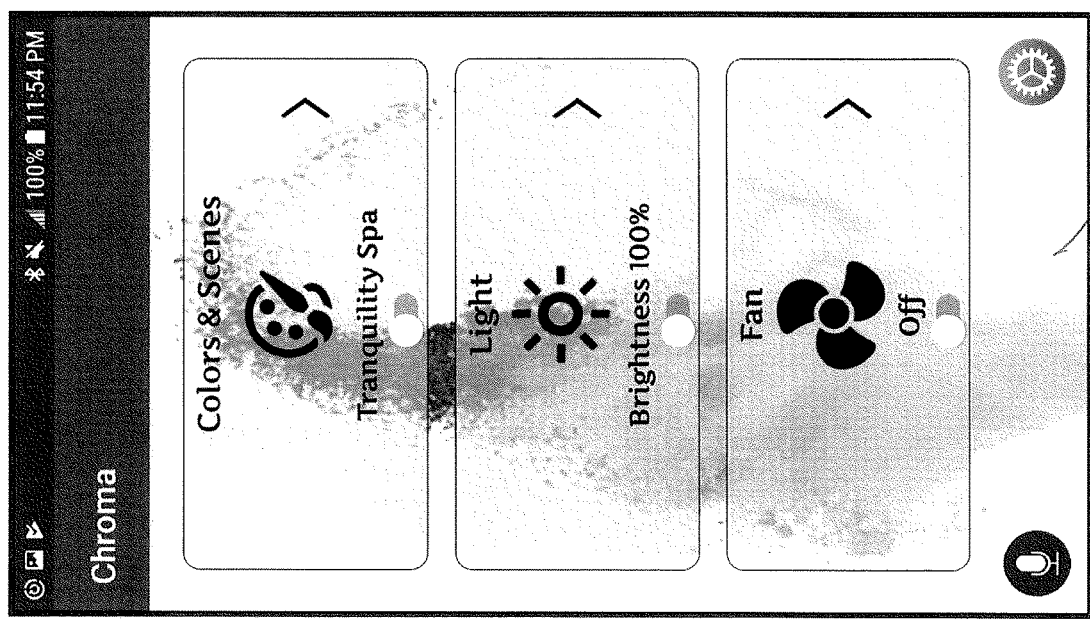
Figure 27:
FIG. 27 depicts brightness control user interfaces of the control program of FIG. 22.
Figure 27:
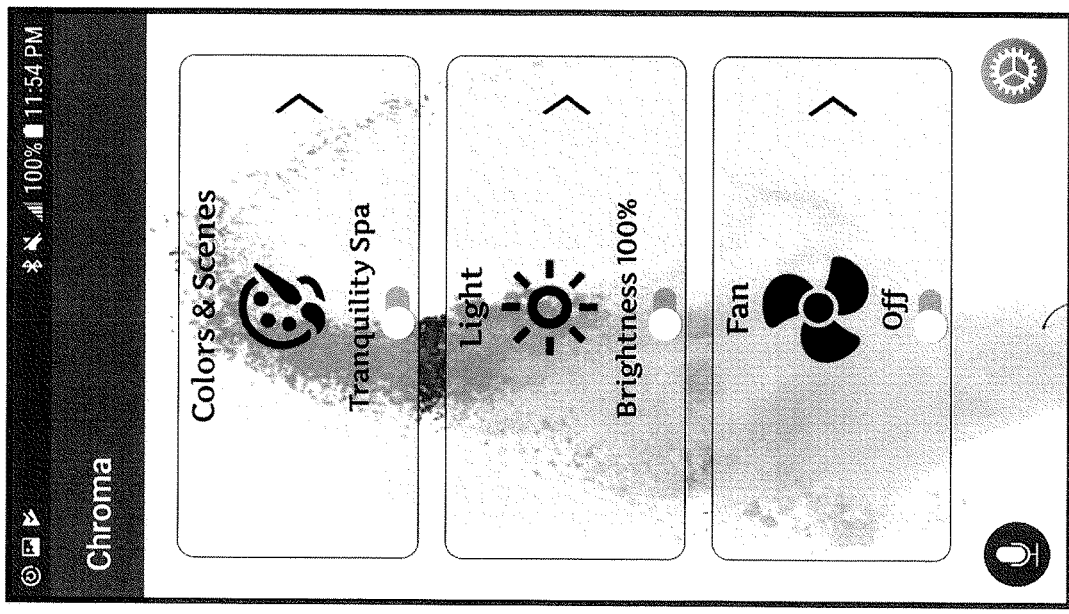
Figure 28:
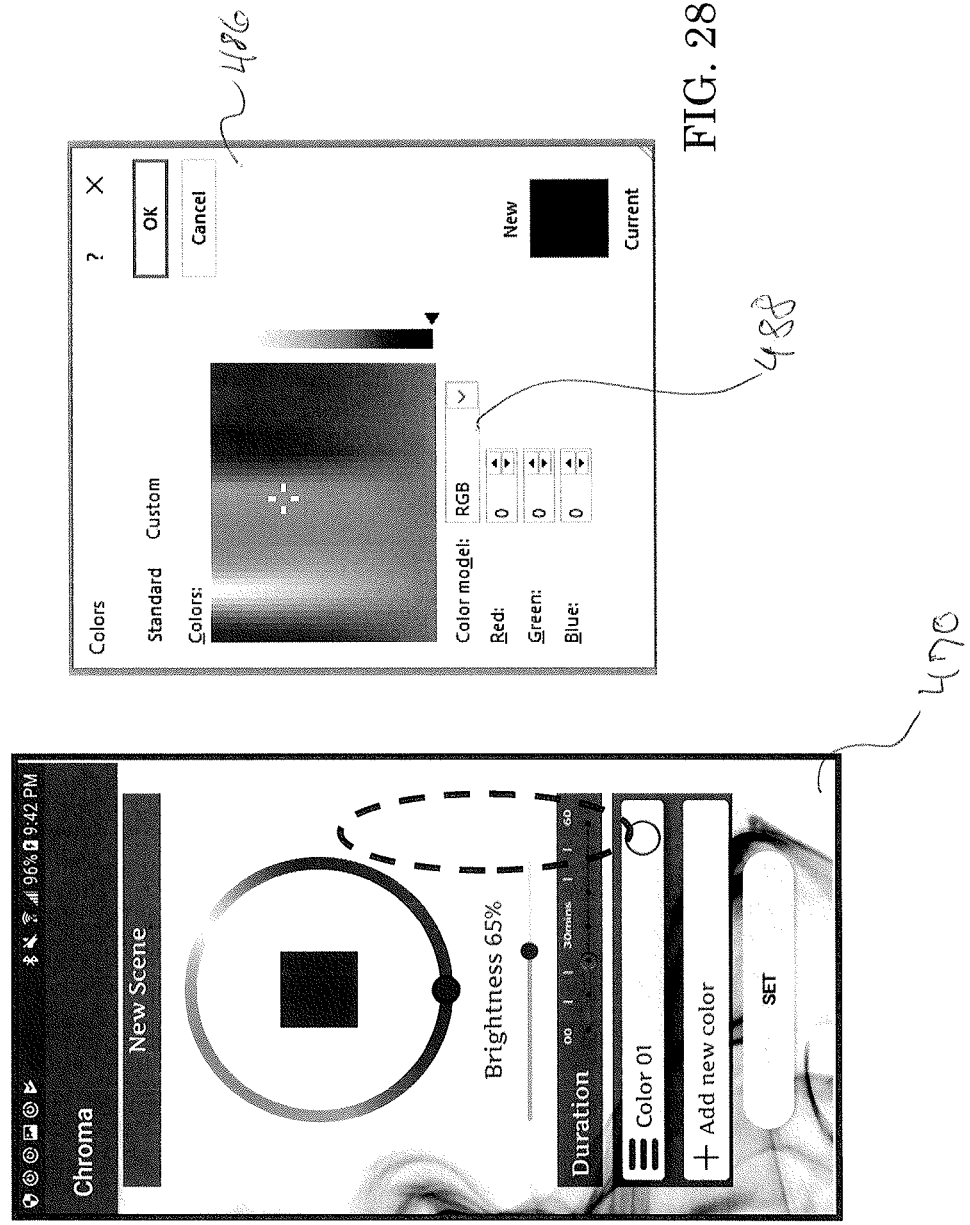
FIG. 28 depicts user interfaces for selecting a custom color with the control program of FIG. 22.

FIG. 22 depicts a mobile application icon 360 for initializing the control program 230 through a mobile device user interface. Further example user interfaces are depicted in FIGS. 23-37. The example user interfaces of FIGS. 23-28 comprise similar virtual buttons to the user interfaces shown in FIGS. 16-21. An additional scene generation user interface 486. Here, a color wheel for selecting an RGB color code is replaced with a text input for red, green, and blue values. Further, this scene generation user interface 486 facilitate user selection of the desired color model for use in developing a scene through drop down menu 488.

Figure 29:
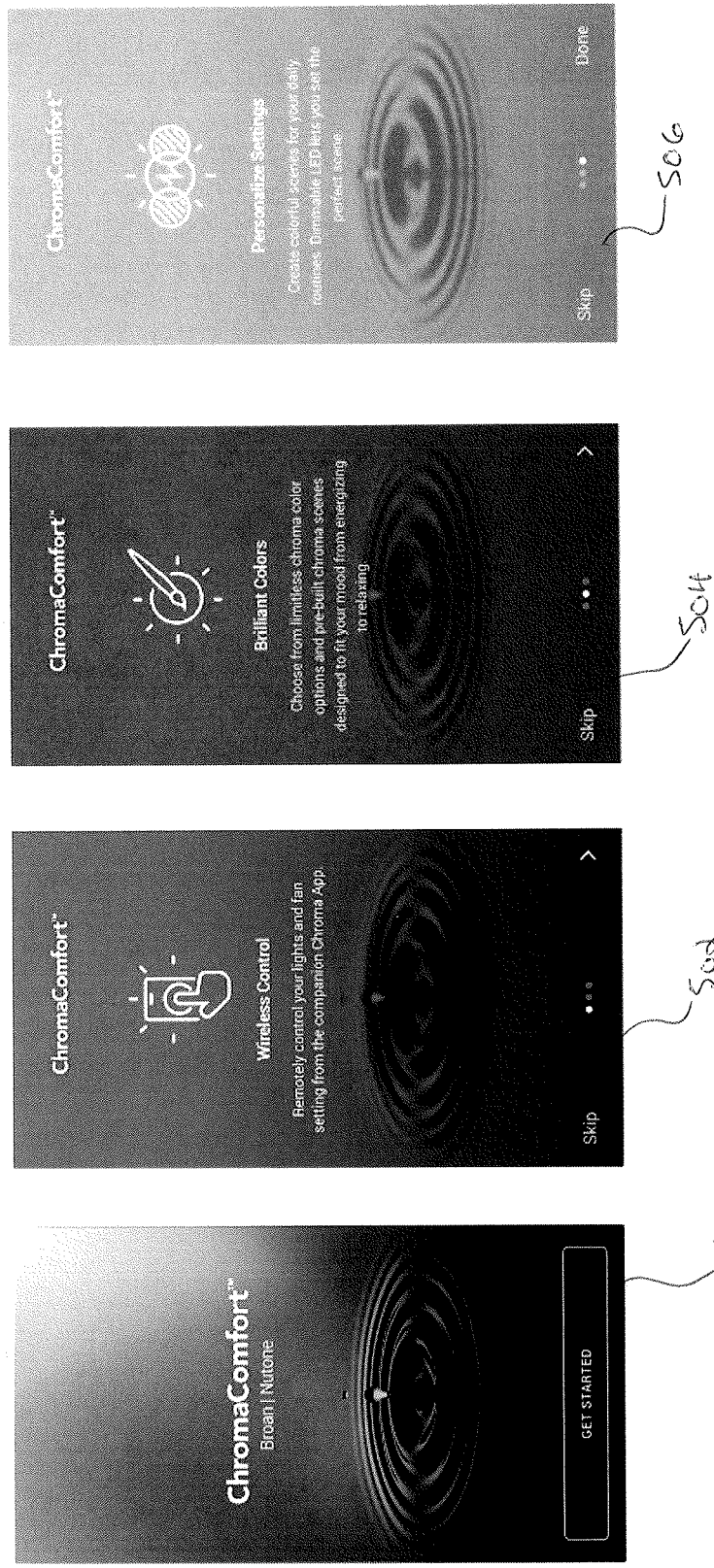
FIG. 29 depicts example user interfaces for setup and initiation of an example control program.
Figure 30:
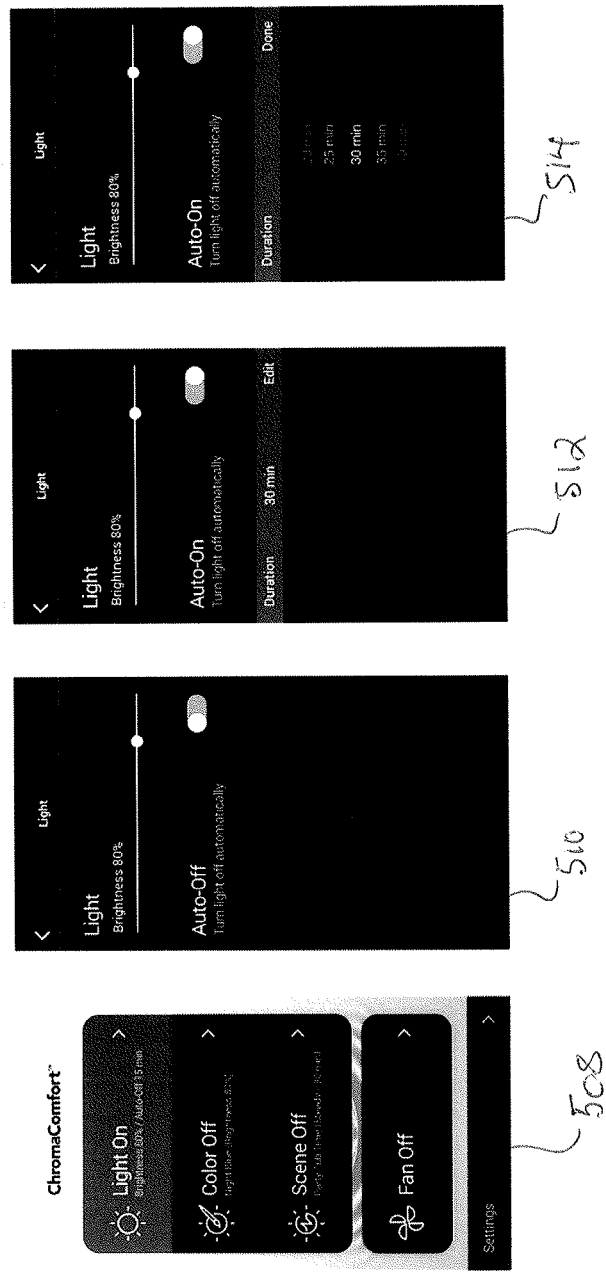
FIG. 30 depicts example user interfaces for lighting settings of the control program of FIG. 29.
Figure 31:
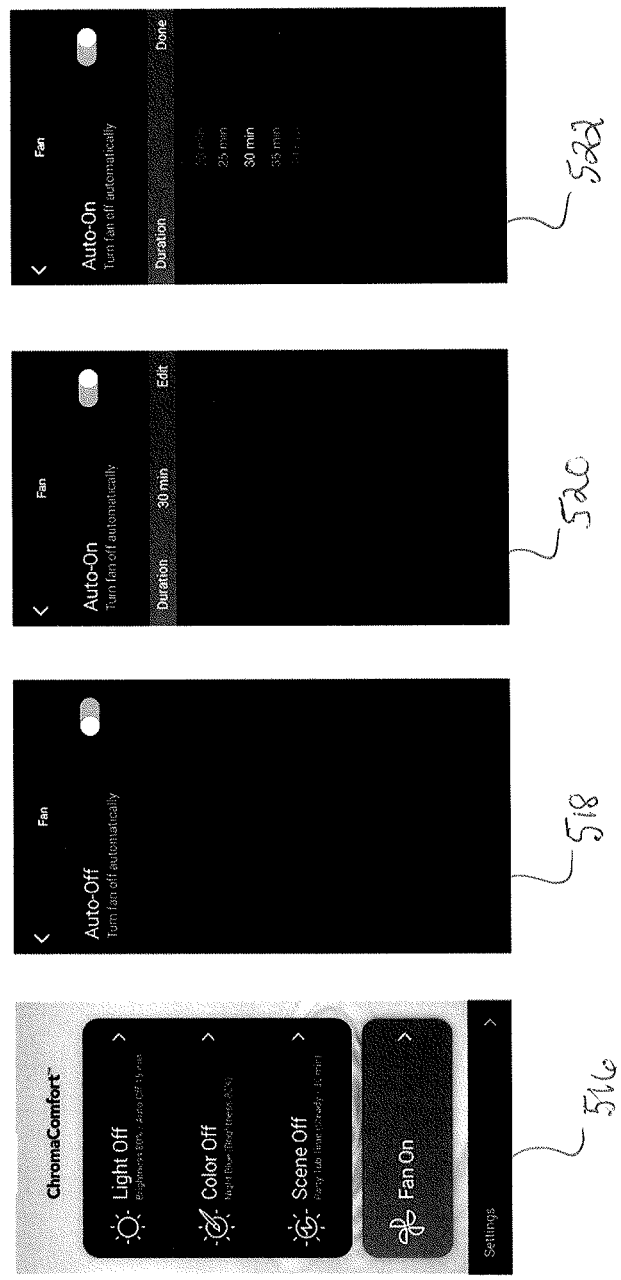
FIG. 31 depicts example user interfaces for fan settings of the control program of FIG. 29.
Figure 32:
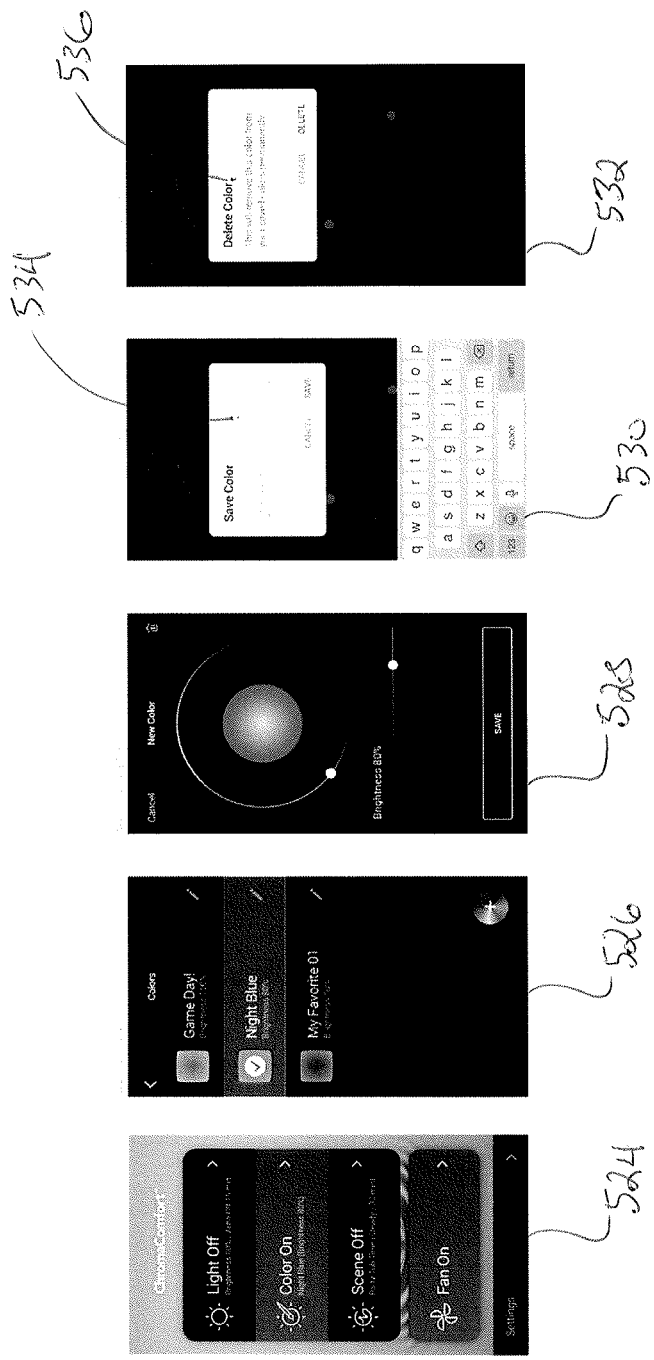
FIG. 32 depicts example user interfaces for color settings of the control program of FIG. 29.
Figure 33:
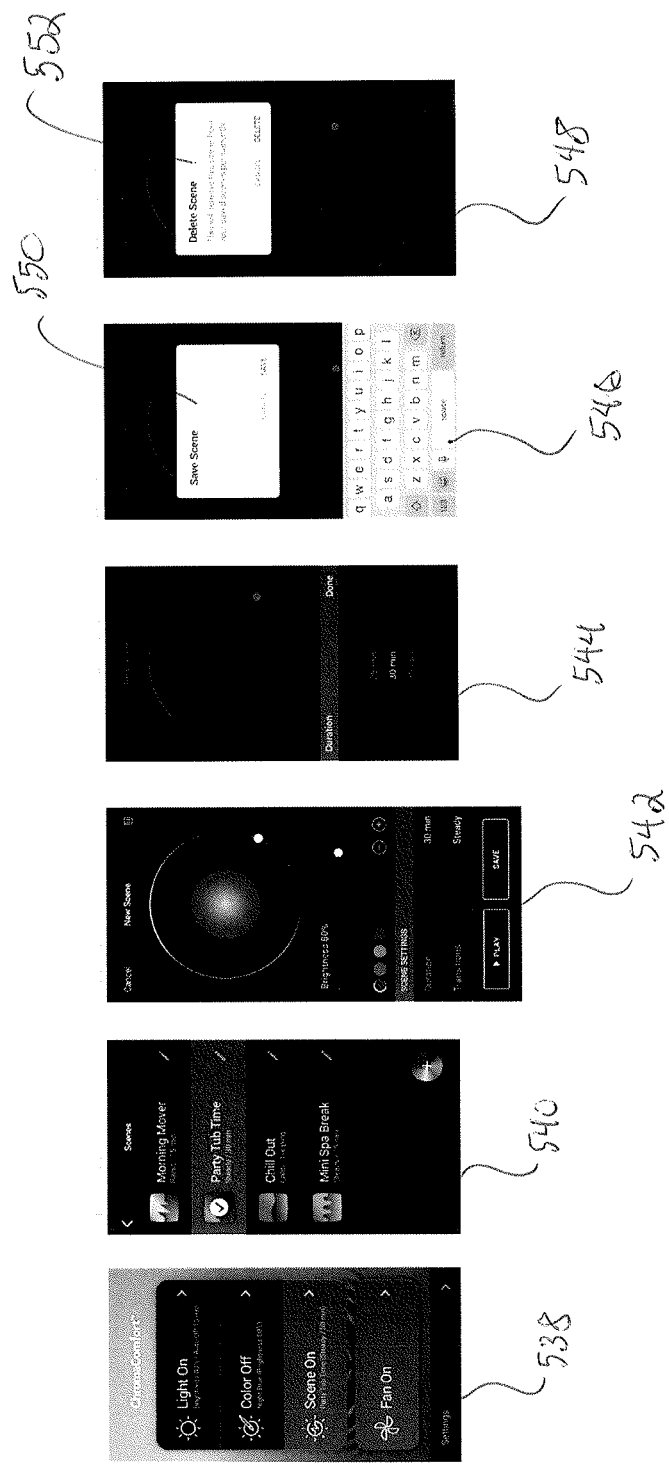
FIG. 33 depicts example user interfaces for scene settings of the control program of FIG. 29.

User interfaces 500, 502, 504, 506 of FIG. 29 deliver "welcome" and "setup" information to a user upon initialization of the control program 230 through the one or more mobile devices 232. FIG. 30 depicts example user interfaces 508, 510, 512, 514 for controlling the lighting element(s) 110, while FIG. 31 depicts example user interfaces 516, 518, 520, 522 for controlling the fan 102. Further example user interfaces 524, 526, 528, 530, 532 for selecting a color or scene are depicted in FIG. 32. In the example user interfaces 530, 532 save and/or delete prompts 534, 536 may guide user interaction with the user interfaces 530, 532. Likewise, example user interfaces 538, 540, 542, 544, 546, 548 are shown in FIG. 33. "Play" and "save" virtual buttons 550, 552 are included in the user interfaces 546, 548 for saving and or editing/deleting a scene.

Figure 34:
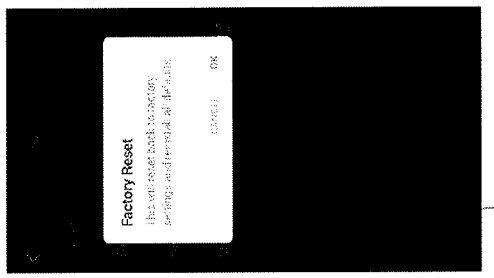
FIG. 34 depicts example user interfaces for mobile applications settings of the control program of FIG. 29.
Figure 34:
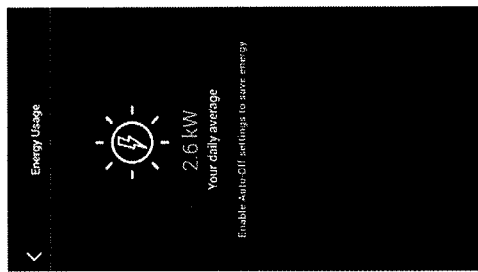
Figure 34:
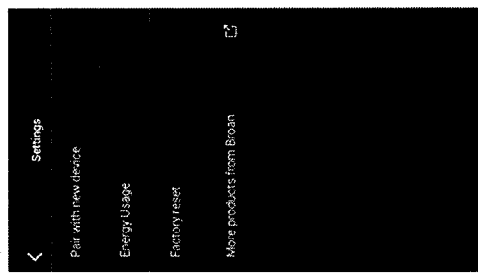
Figure 34:
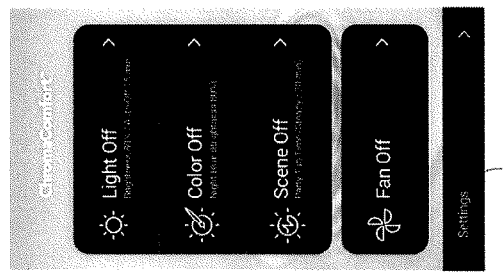

FIG. 34 depicts example user interfaces 554, 556, 558, 560 for adjusting settings of the control program 230. Additionally, the user interfaces 556, 558 give a user the option of tracking and viewing energy usage of the illuminated ventilation apparatus 100.

Figure 35:
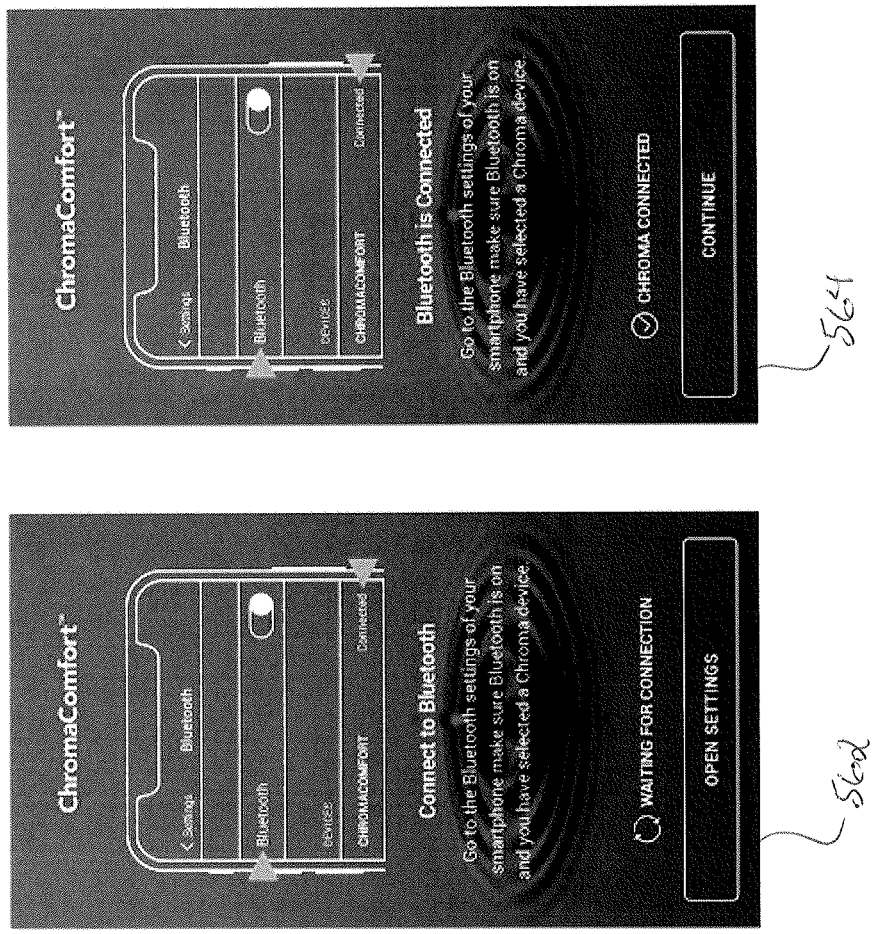
FIG. 35 depicts example user interfaces for mobile device pairing of a mobile device executing the control program of FIG. 29 to the ventilation and lighting systems shown in FIGS. 1-10.
Figure 36:
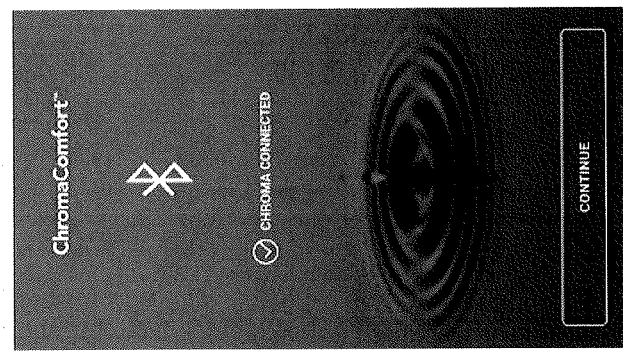
FIG. 36 depicts example user interfaces for mobile device pairing of a mobile device executing the control program of FIG. 29 to the ventilation and lighting systems shown in FIGS. 1-10.
Figure 36:
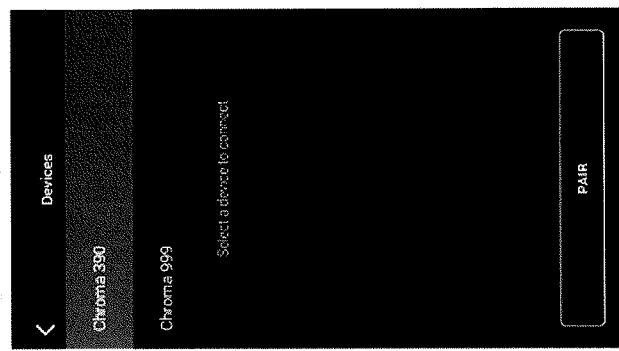
Figure 36:
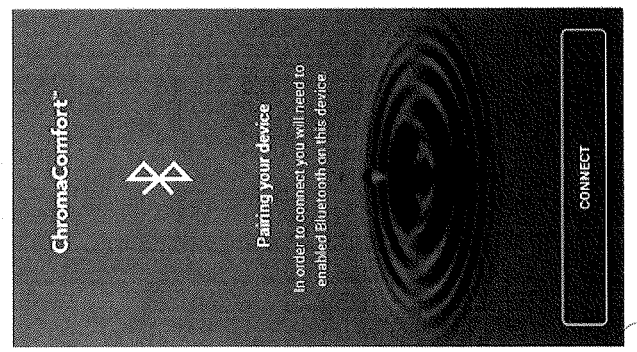
Figure 37:
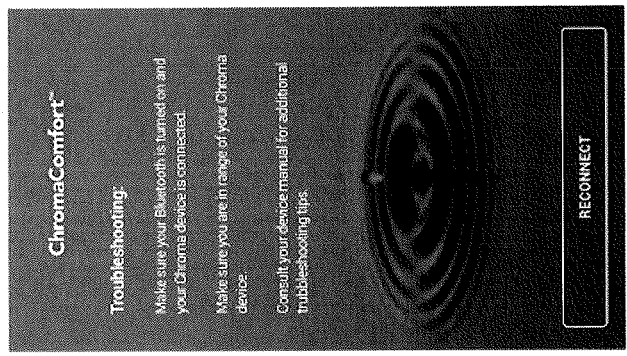
FIG. 37 depicts example user interfaces for troubleshooting a connection of a mobile device executing the control program of FIG. 29 to the ventilation and lighting systems shown in FIGS. 1-10.
Figure 37:
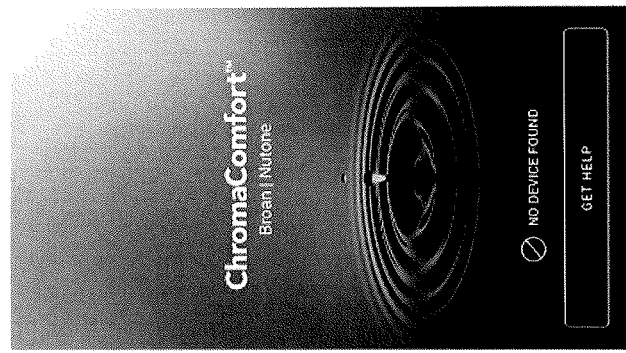
Figure 37:
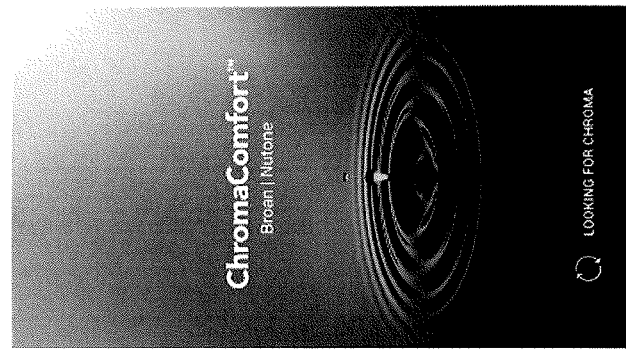

FIG. 35 depicts example user interfaces 562, 564 for wirelessly pairing the illuminated ventilation apparatus 100 with the one or more mobile devices 232 when said devices run the iOS™ operating system. Likewise, FIG. 36 depicts example user interfaces 566, 568, 570 for wirelessly pairing the illuminated ventilation apparatus 100 with the one or more mobile devices 232 when said devices run the Android™ operating system. In the user interface 568, a plurality of illuminated ventilation systems appear available for establishing a wireless connection. In example embodiments, the control program 230 may manage more than one illuminate ventilation system. Further, FIG. 37 depicts example user interfaces 572, 574, 576 that may be presented to the user for troubleshooting a connection between the illuminated ventilation apparatus 100 and the mobile device 232.

The embodiment(s) detailed hereinabove may be combined in full or in part, with any alternative embodiment(s) described.

INDUSTRIAL APPLICABILITY

The above disclosure may represent an improvement in the art because control of a lighting system incorporated into a ventilating fan may increase efficiencies, provide desirable aesthetic improvements, and/or allow for user customization of spaces where both a fan and a light are wanted.

The above disclosure may represent an improvement in the art because customization of exterior patterns and lighting solutions as applied to ventilating fans may increase spatial efficiencies, increase aesthetic appeal, and/or share electrical connections between the components thereof.

While some implementations have been illustrated and described, numerous modifications come to mind without significantly departing from the spirit of the disclosure and the scope of protection is only limited by the scope of the accompanying claims.

Example System Architecture

Architecturally, the representative technology can be deployed anywhere. For example, it may be preferable to operate between one or more devices or across a network of devices controlled by a server. The mobile devices and networks implementing the ventilation and lighting system 100 preferably have memory and bandwidth suitable for storing and transmitting information about the scenes and control inputs received from users. Additionally, a visual display for presenting one or more graphical user interfaces 400 (see FIGS. 16-20 and 22-37) to the user is advantageous. Networking components, including network connections, between and amongst the one or more mobile devices, a network, and the ventilation and lighting system 100 may be wired and/or wireless and suitable for facilitating communications between the one or more mobile devices and the fan and lighting elements of the ventilation and light system.

Example embodiments of the disclosed system and method 100 are described hereinthroughout with reference to FIGS. 1-37. In certain aspects, the system and method 100 may be implemented using hardware or a combination of software and hardware, either by dedicated devices and networks or integrated into other computing resource(s) or distributed across a plurality of computer resources (e.g., the one or more mobile devices). Computing device(s) and networks implementing the system and method 100 may be, for example, desktop computers, mobile computers, tablet computers (e.g., e-book readers), mobile devices (e.g., a smartphone or personal digital assistant), set top boxes (e.g., for a television), video game consoles, or any other devices having appropriate processor, memory, and communications capabilities for gathering, storing, processing, and transmitting the data associated with the system and method 100.

The embodiment(s) detailed hereinabove may be combined in full or in part, with any alternative embodiment(s) described.

The disclosed systems and methods can be implemented with a computer system, using, for example, software, hardware, or a combination of both, either in a dedicated server, or integrated into another entity, or distributed across multiple entities. An exemplary computer system includes a bus or other communication mechanism for communicating information, and a processor coupled with the bus for processing information. The processor may be locally or remotely coupled with the bus. By way of example, the computer system may be implemented with one or more processors. The processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The computer system also includes a memory, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus for storing information and instructions to be executed by processor.

According to one aspect of the present disclosure, the disclosed system can be implemented using a computer system in response to a processor executing one or more sequences of one or more instructions contained in memory. Such instructions may be read into memory from another machine-readable medium, such as data storage device. Execution of the sequences of instructions contained in main memory causes the processor to perform the process steps described herein. One or more processors in a multi-processing arrangement may also be employed to execute the sequences of instructions contained in memory. In alternative implementations, hard-wired circuitry may be used in place of or in combination with software instructions to implement various implementations of the present disclosure. Thus, implementations of the present disclosure are not limited to any specific combination of hardware circuitry and software. According to one aspect of the disclosure, the disclosed system can be implemented using one or many remote elements in a computer system (e.g., cloud computing), such as a processor that is remote from other elements of the exemplary computer system described above.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

All references, including publications, patent applications, and patents, cited herein are hereby incorporated by reference to the same extent as if each reference were individually and specifically indicated to be incorporated by reference and were set forth in its entirety herein.

The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not betaken as limiting the scope of the disclosure.

What is claimed is:

1. A ventilation and lighting system, comprising:
a main housing defining an inlet and an outlet
a fan disposed within a housing and operable to move air through the inlet and outlet;
a grille configured to be located at the main housing inlet, the grille comprising a plate defining a plurality of apertures through which air may move;

a cavity defined in the grille;

one or more lighting elements arranged within the cavity and an optical component covering the cavity, wherein the one or more lighting elements are situated within the cavity such that light developed by the one or more lighting elements is directed towards the fan and away from the optical component so that the light mixes within the cavity before the light transmits through the optical component covering the cavity; and a controller that coordinates operation of the fan and the one or more lighting elements from a remote location.

2. The ventilation and lighting system of claim 1, comprising:

at least one wireless connection, wherein the at least one wireless connection operatively couples the controller to the fan and the one or more lighting elements.

3. The ventilation and lighting system of claim 2, comprising:

one or more mobile devices operatively coupled with at least one of the controller, the fan, and the one or more lighting elements.

4. The ventilation and lighting system of claim 3, comprising:

a control program for controlling the fan and one or more lighting elements, wherein the control program is stored on a memory module disposed in one of the one or more mobile devices, the controller, and the main housing.

5. The ventilation and lighting system of claim 4, wherein user inputs are received at both the one or more mobile devices and the controller, and the control program synchronizes control of the system in response to the user inputs.

6. The ventilation and lighting system of claim 4, comprising one or more scenes stored within the memory module and executable by the control program to coordinate operation of the fan and the one or more lighting elements during a predetermined period.

7. The ventilation and lighting system of claim 1, the controller comprising scene control configured to define one or more scenes each defining predefined light control and fan control, wherein, the light control comprises predefined settings of one or more of color, duration, intensity, saturation, and correlated color temperature and the fan control comprises predefined settings of one or more of duration and power.

8. The ventilation and lighting system of claim 1, wherein the bottom surface of the main housing is reflective.

9. A method for controlling a ventilation and lighting system, comprising:

gathering user;

developing one or more scenes in response to user inputs;

storing the one or more scenes in a memory module for execution by a processor; and adjusting a fan and one or more light emitting diodes (LEDs) to implement the one or more scenes in response to a user selection requesting execution by the processor of the one or more scenes, wherein at least one of the one or more scenes includes a sweeping pattern of colors.

10. The method of claim 9, comprising:

pre-programing one or more scenes in the memory module; and implementing the one or more pre-programmed scenes in response to the user selection.

11. The method of claim 10, comprising:

gathering user inputs from a wall-mounted controller; and adjusting the fan and the one or more LEDs in response to the wall-mounted controller.

12. The method of claim 11, comprising:

presenting one or more virtual buttons to a user; and gathering the user inputs from the one or more virtual buttons.

13. The method of claim 9, wherein the scenes comprise predefined light control and fan control, wherein the light control comprises predefined settings of one or more of color, duration, intensity, saturation, and correlated color temperature and the fan control comprises predefined settings of one or more of duration and power.

14. The method of claim 12, synchronizing adjustments initiated by the one or more virtual buttons and the wall-mounted controller.

15. The method of claim 9, wherein the sweeping pattern of colors is defined according to one or more of the user preferences.

16. The method of claim 9, wherein the sweeping pattern of colors is defined according to one or more of the user preferences as defined by one or more of the user inputs.

17. A ventilation and lighting system, comprising:

a main housing defining an inlet and an outlet a fan disposed within a housing and operable to move air through the inlet and outlet;

a grille configured to be located at the main housing inlet, the grille comprising a plate defining a plurality of apertures through which air may move;

a cavity defined in the grille;

one or more lighting elements arranged within the cavity wherein the one or more lighting elements are situated within the cavity such that light developed by the one or more lighting elements is directed into the cavity so that the light mixes within the cavity before the light exits the cavity; and a controller that coordinates operation of the fan and the one or more lighting elements from a remote location.

18. The ventilation and lighting system of claim 17, the controller comprising scene control configured to define one or more scenes each defining predefined light control and fan control, wherein, the light control comprises predefined settings of one or more of color, duration, intensity, saturation, and correlated color temperature and the fan control comprises predefined settings of one or more of duration and power.

19. The ventilation and lighting system of claim 17, wherein the bottom surface of the main housing is reflective.

20. The ventilation and lighting system of claim 17, wherein at least one of the one or more lighting elements is a LED.

* * * * *